(12) United States Patent
Nishibayashi et al.

(10) Patent No.: US 8,863,228 B2
(45) Date of Patent: Oct. 14, 2014

(54) ENERGY MANAGEMENT APPARATUS AND ENERGY MANAGEMENT SYSTEM

(75) Inventors: Yasuyuki Nishibayashi, Kawasaki (JP); Takeshi Saito, Tokyo (JP); Mitsuru Kanda, Tokyo (JP); Keiichi Teramoto, Tokyo (JP); Yoshihiro Oba, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 103 days.

(21) Appl. No.: 13/474,988

(22) Filed: May 18, 2012

(65) Prior Publication Data
US 2012/0250864 A1 Oct. 4, 2012

Related U.S. Application Data

(63) Continuation of application No. PCT/JP2009/069969, filed on Nov. 26, 2009.

(51) Int. Cl.
*H04L 29/06* (2006.01)
*G01D 4/00* (2006.01)
*H04Q 9/00* (2006.01)
*H02J 13/00* (2006.01)

(52) U.S. Cl.
CPC .............. *G01D 4/004* (2013.01); *Y02B 90/242* (2013.01); *Y02B 90/244* (2013.01); *Y04S 20/322* (2013.01); *H04L 63/0435* (2013.01); *H04Q 2209/60* (2013.01); *Y02E 60/74* (2013.01); *H02J 13/0079* (2013.01); *Y04S 40/24* (2013.01); *H04Q 9/00* (2013.01); *Y04S 10/30* (2013.01); *H04L 63/062* (2013.01); *Y04S 20/327* (2013.01)
USPC .............. 726/1; 726/2; 726/3; 726/4; 726/21; 726/26; 700/286; 700/291; 700/295; 700/296; 700/297; 709/208; 709/218; 709/219; 709/224; 709/238; 709/239

(58) Field of Classification Search
USPC .............. 380/255–30; 705/412; 726/1–4, 21, 726/26–33; 700/286–298; 709/208–211, 709/217–219, 223–232, 238–244
See application file for complete search history.

(56) References Cited

U.S. PATENT DOCUMENTS

| 5,495,239 A | 2/1996 | Ouellette |
| 5,691,715 A | 11/1997 | Ouellette |

(Continued)

FOREIGN PATENT DOCUMENTS

| GB | 2433376 A | * | 6/2007 |
| JP | 2005-073415 | | 3/2005 |

(Continued)

OTHER PUBLICATIONS

International Search Report for PCT/JP2009/069969 dated Feb. 23, 2010.
Office Action dated Jul. 30, 2013 in counterpart Japanese Application No. 2011-543044 and English-language translation thereof.
Extended European Search Report dated Jan. 20, 2014 in European Patent Application No. 09851656.0.

* cited by examiner

*Primary Examiner* — Madhuri Herzog
(74) *Attorney, Agent, or Firm* — Nixon & Vanderhye, P.C.

(57) ABSTRACT

An energy management apparatus includes: a communicator capable of communicating with at least a meter apparatus among the meter apparatus and a server apparatus that collects measurement information from the meter apparatus; a device registration processor configured to determine whether the direct communicator to the server apparatus can communicate with the server apparatus; if the direct communication is possible, transmit to the server apparatus a device registration message that requests to register a device identifier of the meter apparatus and a device identifier of the energy management apparatus; and, if the direct communication to the server apparatus is not possible, transmit the device registration message for the server apparatus to the meter apparatus; a communication processor configured to obtain energy control information of the device transmitted from the server apparatus; and a control executor configured to control the used energy amount of the device based on the energy control information.

9 Claims, 25 Drawing Sheets

(56) References Cited

U.S. PATENT DOCUMENTS

| | | |
|---|---|---|
| 6,115,676 A | 9/2000 | Rector et al. |
| 8,010,640 B2 * | 8/2011 | Aune et al. .................. 709/222 |
| 2006/0259447 A1 * | 11/2006 | Kings et al. .................. 705/412 |
| 2009/0083167 A1 * | 3/2009 | Subbloie .................. 705/34 |
| 2009/0138099 A1 * | 5/2009 | Veillette .................. 700/22 |

FOREIGN PATENT DOCUMENTS

| | | |
|---|---|---|
| JP | 2007-033305 | 2/2007 |
| WO | 2009067251 | 5/2009 |

| DEVICE INDENTIFIER | ACCUMULATED ELECTRICAL POWER VALUE | MEASUREMENT TIME |
|---|---|---|
| P1.N1 | X(W) | hh:mm:ss |

FIG. 6

| DEVICE IDENTIFIER | ROUTE TYPE | ROUTE |
|---|---|---|
| P1.N100 | INDIRECT | A3 |

FIG. 7

| DEVICE IDENTIFIER | ROUTE TYPE | ROUTE |
|---|---|---|
| P1.N1 | DIRECT | A3 |
| P1.N100 | DIRECT | A2 |

FIG. 8

| TARGET ELECTRICAL POWER VALUE | EXPIRATION DATE |
|---|---|
| Y(W) | hh:mm:ss |

FIG. 9

| PROTOCOL | DEVICE IDENTIFIER | DEVICE TYPE | ROUTE TYPE | ROUTE | CONTROL STATE |
|---|---|---|---|---|---|
| ANSI C12.22 | P1.N1 | METER | DIRECT | A3 | — |
| HTTP | 216.23.181.212 | AMI HEAD END | — | — | — |
| ZigBee SEP | 0x0000000000000001 | AIR CONDITIONER | — | — | CURRENTLY CONTROLLED |
| ZigBee SEP | 0x0000000000000002 | TELEVISION | — | — | UNCONTROLLED |

FIG. 10

| GROUP IDETIFIER | PROTOCOL | DEVICE IDENTIFIER | DEVICE TYPE | ROUTE TYPE | ROUTE | ACCUMULATED ELECTRICAL POWER VALUE | TARGET ELECTRICAL POWER VALUE |
|---|---|---|---|---|---|---|---|
| UserID:A | ANSI C12.22 | P1.N1 | METER | INDIRECT | A2 | X(W) | — |
| UserID:A | HTTP | 202.33.96.40 (ETHERNET.00:00:00:00:00:01) | HEMS | — | — | — | Y(W) |
| UserID:B | ANSI C12.22 | P1.N2 | METER | DIRECT | A1 | Z(W) | — |

FIG. 11

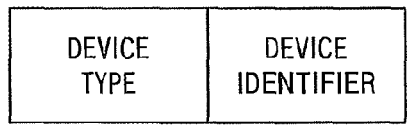
FIG. 15
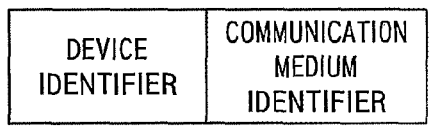
FIG. 16
FIG. 17    MULTIPLE SETS ARE POSSIBLE
FIG. 18

| DEVICE IDENTIFIER | ROUTE TYPE | ROUTE | METER ENCRYPTION KEY | HEMS ENCRYPTION KEY |
|---|---|---|---|---|
| P1.N100 | INDIRECT | A3 | α | β |

FIG. 27

| PROTOCOL | DEVICE IDENTIFIER | DEVICE TYPE | ROUTE TYPE | ROUTE | CONTROL STATE | ENCRYPTION KEY |
|---|---|---|---|---|---|---|
| ANSI C12.22 | P1.N1 | METER | DIRECT | A3 | — | — |
| HTTP | 216.23.181.212 | AMI HEAD END | — | — | — | β |
| ZigBee SEP | 0x0000000000000001 | AIR CONTIONER | — | — | CURRENTLY CONTROLLED | — |
| ZigBee SEP | 0x0000000000000002 | TELEVISION | — | — | UNCONTROLLED | — |

FIG. 28

| GROUP IDENTIFIER | PROTOCOL | DEVICE IDENTIFIER | DEVICE TYPE | ROUTE TYPE | ROUTE | ACCUMULATED ELECTRICAL POWER VALUE | TARGET ELECTRICAL POWER VALUE | ENCRYPTION KEY |
|---|---|---|---|---|---|---|---|---|
| UserID:A | ANSI C12.22 | P1.N1 | METER | INDIRECT | A2 | X(W) | — | α |
| UserID:A | HTTP | 202.33.96.40(P1.N3) | HEMS | — | — | — | Y(W) | β |
| UserID:B | ANSI C12.22 | P1.N2 | METER | DIRECT | A1 | Z(W) | — | γ |

FIG. 29

| DESTINATION IDENTIFIER | TRANSMISSION SOURCE IDENTIFIER | READING TYPE | READING INDEX | READING BYTE COUNT |
|---|---|---|---|---|

FIG. 32

| DESTINATION IDENTIFIER | TRANSMISSION SOURCE IDENTIFIER | READING RESULT | READING BYTE COUNT | READING DATA |
|---|---|---|---|---|

FIG. 33

| DESTINATION IDENTIFIER | TRANSMISSION SOURCE IDETIFIER | WRITING TYPE | WRITING INDEX | WRITING BYTE COUNT | WRITING DATA |
|---|---|---|---|---|---|

FIG. 34

| DESTINATION IDENTIFIER | TRANSMISSION SOURCE IDENTIFIER | WRITING RESULT |
|---|---|---|

FIG. 35

ENERGY MANAGEMENT APPARATUS AND ENERGY MANAGEMENT SYSTEM

CROSS REFERENCE TO RELATED APPLICATIONS

This application is a continuation of International Application No. PCT/JP2009/069969, filed on Nov. 26, 2009, the entire contents of which is hereby incorporated by reference.

FIELD

The present embodiments relate to an energy management apparatus and an energy management system for controlling the used energy amount of in-home equipment, for example.

BACKGROUND

U.S. Pat. No. 5,495,239 discloses a method where a measurement information relay apparatus is set on a distribution transformer of an electrical power system network and the apparatus transfers communication between a meter apparatus of generating measurement information and a server apparatus of collecting the measurement information. Also, U.S. Pat. No. 5,691,715 discloses a method of registering in advance a device identifier of a meter apparatus in a measurement information relay apparatus and a server apparatus in a fixed manner to thereby block measurement information from an unauthorized meter apparatus. Further, U.S. Pat. No. 6,115,676 discloses a method of giving a relay block instruction for an overlimit household meter apparatus.

In recent years, according to NIST (National Institute of Standards and Technology) and CENELEC (European Committee for Electrotechnical Standardization), a system for solving a problem in electrical power transmission between suppliers and consumers by using information techniques in a positive manner is named "smart grid" and standardization activities of various kinds of techniques are promoted. Among these, an application called "HEMS (Home Energy Management System)" is assumed to control a household electrical appliance in a consumer's home based on the electrical power supply-and-demand trends.

The HEMS can be provided in an embedded manner as a function of a home meter apparatus, or in a separated manner from the meter apparatus as another energy management apparatus (HEMS apparatus), where the connection method to the Internet is various. Especially, in the latter case, there is a problem that it is difficult to correctly form a pair of a meter apparatus and an energy management apparatus installed in a customer's home, by a server apparatus on the Internet, wherein the server apparatus manages measurement information collection and supply-and-demand control. In this case, it is not possible to collect an actual electrical power usage state of the customer's home as measurement information from the meter apparatus and instruct an energy management apparatus to perform electrical control of household electrical appliances, wherein the energy management apparatus is separately installed from the meter apparatus in the customer's home.

By combining U.S. Pat. Nos. 5,495,239, 5,691,715 and 6,115,676 in a simple manner, it is possible collect measurement information from a normal meter apparatus and give a relay block instruction for a meter apparatus in a case where a specific condition is satisfied. However, as described above, in a system in which the meter apparatus and the energy management apparatus are separately installed in a home, there is a problem that it is difficult to dynamically associate the meter apparatus and the energy management apparatus in the same household by the server apparatus side on the Internet. Also, in a case where the registration information of each apparatus including a corresponding device identifier is transmitted or received in a plaintext form via the Internet, there is a security problem that it is not possible to secure the confidentiality and integrity of communication messages.

The embodiment aims to provide an energy management apparatus and an energy management system which correctly forms a pair of a meter apparatus and an energy management apparatus installed in a customer's home by a server apparatus.

SUMMARY

There is provided an energy management apparatus including: a communicator capable of communicating with at least a meter apparatus among the meter apparatus and a server apparatus, the meter apparatus measuring a used energy amount of a device and the server apparatus collecting measurement information from the meter apparatus; a device registration processor configured to determine whether the communicator can communicate with the server apparatus; if the direct communication to the server apparatus is possible, transmit to the server apparatus a device registration message that requests to register a device identifier of the meter apparatus and a device identifier of the energy management apparatus to be associated with each other in the server apparatus; and, if the direct communication to the server apparatus is not possible, transmit the device registration message for the server apparatus to the meter apparatus; a communication processor configured to obtain energy control information of the device transmitted from the server apparatus; and a control executor configured to control the used energy amount of the device based on the energy control information.

According to the embodiment, it becomes possible correctly form a pair of a meter apparatus and an energy management apparatus installed in a customer's home by a server apparatus.

BRIEF DESCRIPTION OF THE DRAWINGS

FIG. 6 illustrates a configuration example of a measurement information storage of a meter apparatus according to the first embodiment;

FIG. 7 illustrates a configuration example of a device information storage of the meter apparatus according to the first embodiment;

FIG. 8 illustrates a configuration example of a device information storage of the concentrator according to the first embodiment;

FIG. 9 illustrates a configuration example of a supply-and-demand control instruction information storage of the HEMS apparatus according to the first embodiment;

FIG. 10 illustrates a configuration example of a device information storage of the HEMS apparatus according to the first embodiment;

FIG. 11 illustrates a configuration example of a device information storage of the AMI head end according to the first embodiment;

FIG. 15 illustrates a configuration example of a search message according to the first embodiment;

FIG. 16 illustrates a configuration example of a search response message according to the first embodiment;

FIG. 17 illustrates a configuration example of a device registration message according to the first embodiment;

FIG. 18 illustrates a configuration example of a device registration response message according to the first embodiment;

FIG. 27 illustrates a configuration example of a device information storage of the meter apparatus according to the second embodiment;

FIG. 28 illustrates a configuration example of a device information storage of the HEMS apparatus according to the second embodiment;

FIG. 29 illustrates a configuration example of a device information storage of the AMI head end according to the second embodiment;

FIG. 32 illustrates a configuration example of a reading request message according to the second embodiment;

FIG. 33 illustrates a configuration example of a reading request response message according to the second embodiment;

FIG. 34 illustrates a configuration example of a writing request message according to the second embodiment;

FIG. 35 illustrates a configuration example of a writing request response message according to the second embodiment.

DETAILED DESCRIPTION

In the following, the embodiments will be explained with reference to the drawings.

(First Embodiment)

Figure 1:
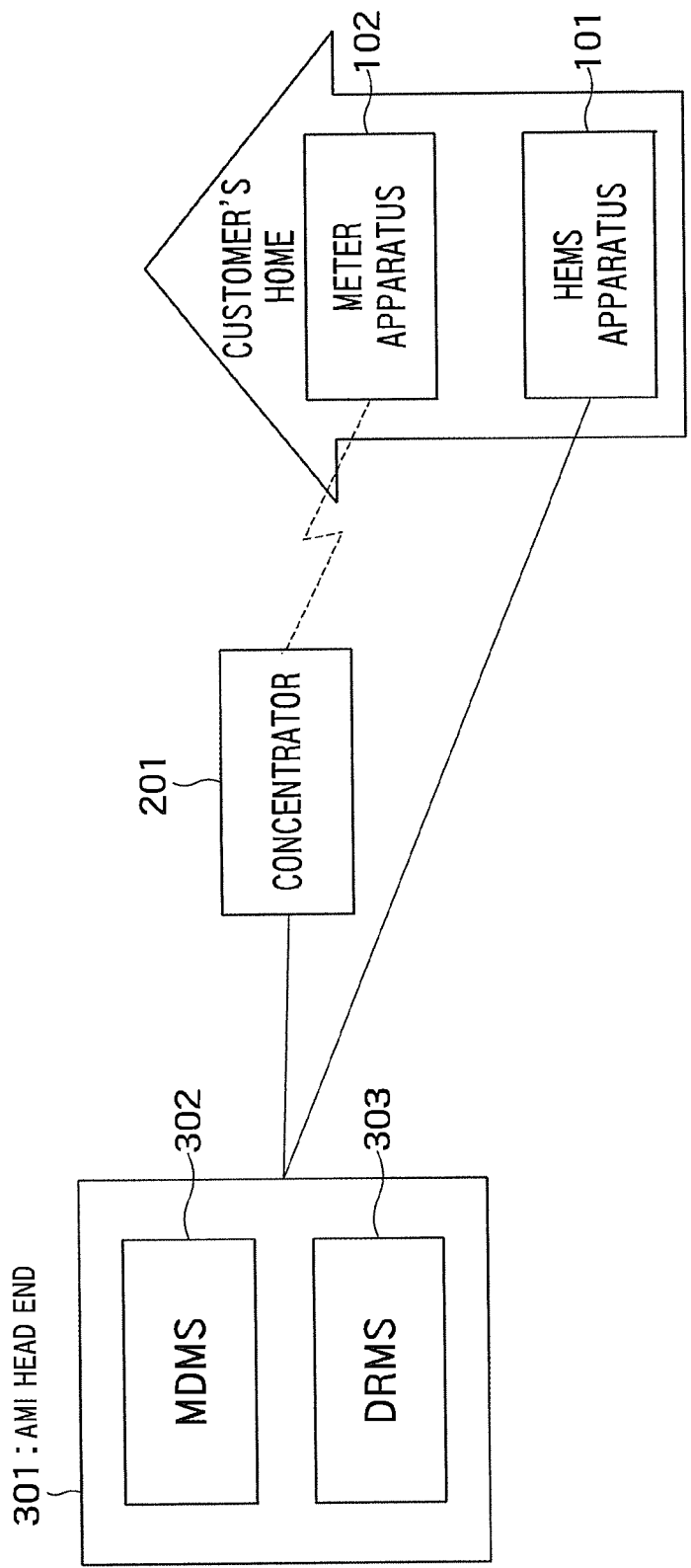
FIG. 1 illustrates a system configuration diagram related to a first embodiment.

FIG. 1 is a diagram illustrating a system configuration according to the first embodiment. In FIG. 1, an HEMS (Home Energy Management system) apparatus 101 that operates as an energy management apparatus in a customer's home and a meter apparatus 102 that measures an electrical power usage of in-home equipment are installed and connected to an AMI (Advanced Metering Infrastructure) head end 301 on the Internet via a network. The AMI head end 301 is realized as a computing server apparatus and has an MDMS (Metering Data Management system) function 302 of collecting measurement information of the meter apparatus 102 and a DRMS (Demand Response Management system) function 303 of managing an instruction of electrical power supply-and-demand control. With a configuration of separately providing these functions to different server apparatuses and operating them together via DB (Data Base), it is equally possible to realize the same functions. However, in the following description, the embodiment of the present invention will be explained based on an example case where one server apparatus has both functions. It should be noted that the embodiment is not provided for households and can be applied with the same process to, for example, an energy control system for building automation. The energy management apparatus for buildings is generally called "BEMS (Building Energy Management system)" and controls the lightning and air conditioning in a facility network. It should be noted that, in the following description, the embodiment is explained based on an example of HEMS.

The meter apparatus 102 in the customer's home measures an electrical power usage state of in-home equipment at regular intervals and transmits measurement information to the AMI head end 301 (or MDMS server) on the Internet. An electrical power provider can manage the transition of demand variation and price variation of energy in real time, based on information collected in the AMI head end. Although a configuration of the meter apparatus 102 will be explained in detail in FIG. 2, various forms of access to the Internet by the meter apparatus 102 are possible.

For example, when the meter apparatus 102 performs communication by GSM (Global System for Mobile Communications) or FTTH (Fiber To The Home), it is possible to directly connect to an Internet network. Meanwhile, in the case of performing communication by BPL (Broadband over Power Line) or wireless WAN (Wide Area Network)/LAN (Local Area Network) or by a unique-type wireless communication medium, a case is possible where the Internet network is connected via a relay apparatus called "concentrator 201."

In a case where the concentrator 201 is passed through, there are further cases where the meter apparatus 102 performs communication by IP (Internet Protocol) and it performs communication by other methods than IP. In a case where the meter apparatus 102 performs communication by other methods than IP, the concentrator 201 terminates IP communication with the AMI head end on the Internet and converts it into a communication protocol that can be processed by the meter apparatus 102.

Although there are various access forms of the meter apparatus 102, in the following, the embodiment will be explained based on an example case where the meter apparatus 102 having an IP communication function communicates with the AMI head end on the Internet through wireless communication to the concentrator 201. However, the first embodiment does not depend on an access form of the meter apparatus 102.

The HEMS apparatus 101 in the customer's home performs supply-and-demand control (i.e. energy usage control)

with change of operational state in household electrical appliances, based on supply-and-demand control instruction information (i.e. energy control information) generated by the AMI head end 301 (i.e. DRMS server) on the Internet. In addition to a method where the HEMS apparatus 101 directly obtains the supply-and-demand control instruction information (i.e. energy control information) from the AMI head end 301, there is a method of indirectly obtaining it via the meter apparatus 102. Specifically, the supply-and-demand control is executed by reporting an instruction for changing an operation of a PC (Personal Computer) or digital television from a normal state to an electrical power saving state or by reporting an instruction for changing the temperature of an air conditioner or refrigerator. Also, the HEMS can dynamically observe an energy reduction effect upon implementing the supply-and-demand control while changing parameters of the above appliance control or price variation, and feeds back them to the AMI head end 301 (i.e. DRMS server). The energy reduction effect indicates, for example, an effect of the electrical power reduction amount or $CO_2$ reduction amount. The HEMS function can be directly mounted on the meter apparatus 102, household electrical appliances, a storage battery and further an electrical vehicle parked outside. In the following description, the embodiment will be explained based on an example case where the HEMS apparatus 101 is installed as a separate apparatus from the meter apparatus 102 or household electrical appliances. However, the first embodiment does not depend on an actual configuration of the HEMS apparatus 101.

In order for the HEMS apparatus 101 to refer the latest measurement information held in the meter apparatus 102 in the home and implement supply-and-demand control, the HEMS apparatus 101 communicates with the meter apparatus 102 using a communication medium such as ZigBee that realizes a wireless PAN (Personal Area Network).

Similar to a case of the meter apparatus 102, various access forms from the HEMS apparatus 101 to the Internet network are possible. For example, in a case where the HEMS apparatus 101 has an out-home connection function such as a GSM and FTTH in addition to an in-home connection function such as a wireless PAN, it is possible to directly connect to the Internet network. However, in a case where the HEMS apparatus 101 has only an in-home connection function such as a wireless PAN and does not have an out-home connection function, the meter apparatus 102 needs to mediate communication between the HEMS apparatus 101 and the AMI head end 301.

Here, an object of the first embodiment will be explained. As described later, the AMI head end 301 associates and manages the meter apparatus 102 and the HEMS apparatus 101 for each household and generates supply-and-demand control instruction information. At this time, in a form where the HEMS apparatus 101 alone communicates with the AMI head end 301, there arises a problem that it is difficult to associate the apparatuses installed in the customer's home with each other. For example, although a method is possible where a user manually sets an identifier that can uniquely identify a customer via a display apparatus, there is a problem that the usability degrades and it takes certain time or more from an apparatus setting to an operation start. Also, although a method is possible where the meter apparatus 102 mediates all communication between the HEMS apparatus 101 and the AMI head end 301 including communication for equipment registration to associate a plurality of apparatuses installed in the customer's home with each other, the meter apparatus 102 that is realized as an embedded device generally has a poor processing ability and therefore there is a problem that, if the meter apparatus 102 relays even a communication message that can be directly transmitted from the HEMS apparatus 101 to the AMI head end 301, a load increase is caused in the communication amount and the processing amount. The first embodiment solves the above problems and is provided such that, in various connection forms of the meter apparatus 102 and the HEMS apparatus 101 with respect to the Internet network, it is possible to provide an effect of suppressing a load of the communication amount and the processing amount and dynamically associating both apparatuses by the AMI head end 301 on the Internet instead of relying on a user.

Figure 2:
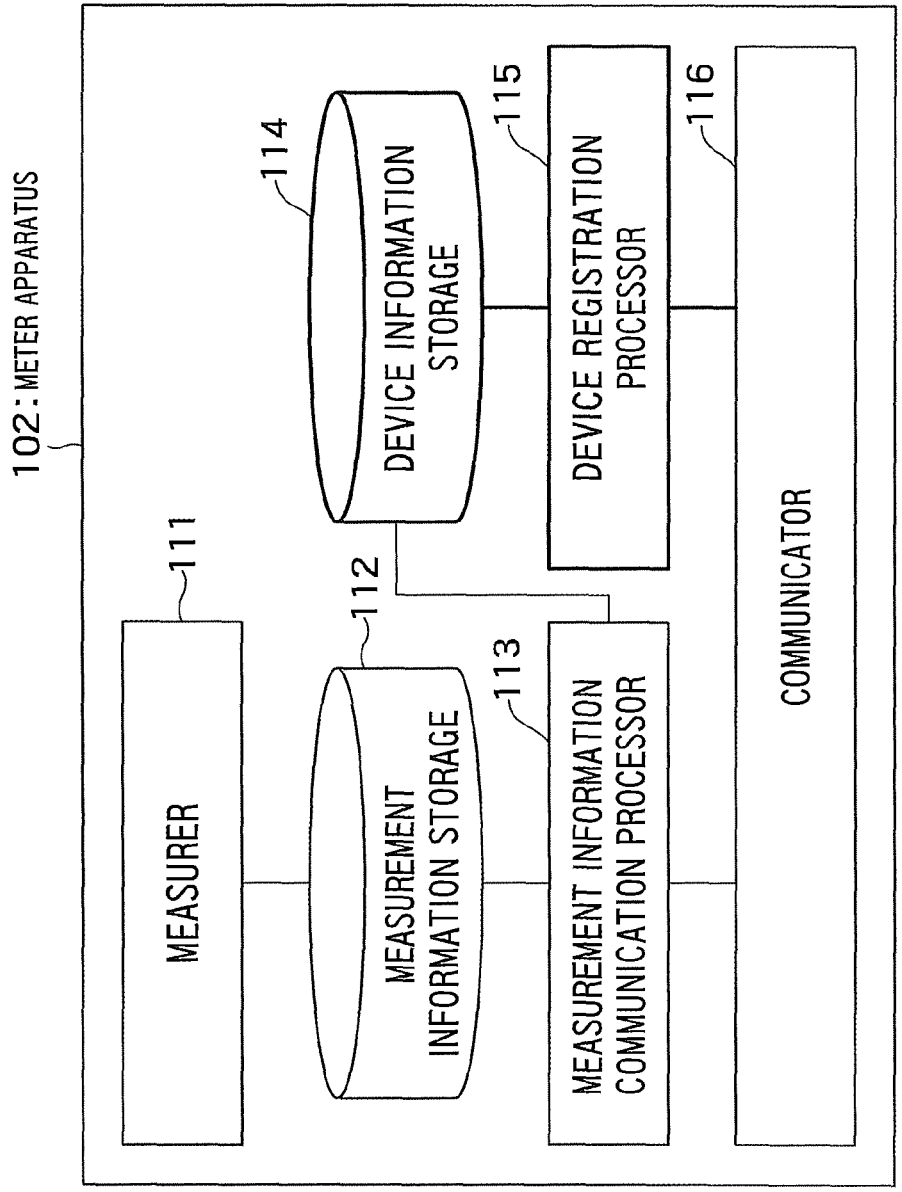
FIG. 2 illustrates a configuration diagram of a meter apparatus according to the first embodiment.

FIG. 2 is a diagram illustrating a configuration of the meter apparatus 102 according to the first embodiment. The meter apparatus 102 has a measurer 111, a measurement information storage 112, a measurement information communication processor 113, a device information storage 114, a device registration processor 115 and a communicator 116. Configuration examples of the measurement information storage 112 and the device information storage 114 will be illustrated in FIG. 6 and FIG. 7. In the first embodiment, although the meter apparatus 102 will be explained using an electrical power meter as an example, the first embodiment is applicable to other meter types such as a gas meter. That is, a measurement target of the meter apparatus 102 is not limited to an electrical power usage but may be a gas usage or other energy usages. Also, in the present embodiment, although the AMI head end 301 performs supply-and-demand control of electrical power of in-home equipment, it is equally possible to perform supply-and-demand control of other energy types such as a gas.

The measurer 111 in FIG. 2 measures an electrical power value accumulation and stores measurement information in the measurement information storage 112. There are many kinds of measurement methods depending on an operational principle, structure, use application or the like, but, in most cases, standard homes use a method of performing an accumulation measurement of effective electrical power of alternating-current electrical power. However, the first embodiment does not depend on a specific measurement method.

The measurer 111 stores the measurement information in the form shown in FIG. 6, in the measurement information storage 112. In FIG. 6, there are an accumulated electrical power value (in a watt unit) and the measurement time together with the device identifier of the meter apparatus 102. In addition to this, it is equally possible to store, for example, charging information.

As shown in FIG. 7, the device information storage 114 stores route information leading to a destination apparatus (i.e. AMI head end 301) of measurement information.

The measurement information communication processor 113 generates a communication message to be transmitted to the destination apparatus stored in the device information storage 114, based on the measurement information stored in the measurement information storage 112. In the first embodiment, the measurement information communication processor 113 performs communication processing according to, for example, an ANSI C12.22 (American National Standard Protocol Specification For Interfacing to Data Communication Networks) protocol.

The ANSI C12.22 protocol discloses a method of realizing metering information transmission/reception between devices connected via a network, by a reading/writing request message to a data table defined by an ANSI C12.19 (American National Standard For Utility Industry End Device Tables) protocol. By this means, it is possible not only to transmit the measurement information from the meter apparatus 102 to the AMI head end 301 on the Internet but also to transmit charging information in an electrical power unit from the AMI head end 301 to the meter apparatus 102 to update it to the latest state.

Also, the measurement information communication processor 113 generates a communication message to be transmitted and analyzes a received communication message.

The device registration processor 115 realizes a device registration by reporting the device identifier of the meter apparatus 102 to the AMI head end 301 of the measurement information destination, and performs processing of constructing a route leading to the head end 301. A result of the device registration is managed according to a constitution of the ANSI C12.22 protocol. The route information exemplified in FIG. 7 is configured with the device identifier of the AMI head end 301, a route type and a route, wherein the route type indicates whether direct transmission is possible or indirect transmission via a relay apparatus is required.

It should be noted that the ANSI C12.22 itself denotes a protocol defining a communication specification in an application layer and does not limit an operation in a network layer or a transport layer. Therefore, although the route information in FIG. 7 is expressed like "A3," actually, it is assumed that it is formed with the IP address or MAC (Medium Access Control) address of an apparatus to which the measurement information needs to be transferred next.

Also, the measurement information storage 112 and the device information storage 114 of the meter apparatus 102 may be realized with configurations compliant with the data table of the ANSI C12.19 protocol and a route table of the ANSI C12.22 standard. Further, the first embodiment is even applicable to a case where these two storages 112 and 114 are integrated to one storage.

Also, when receiving a device registration instruction from the HEMS apparatus 101, the device registration processor 115 generates a device registration message including the device identifier of the own apparatus (i.e. meter apparatus 102) and the device identifier of the HEMS apparatus 101, transmits the generated device registration message to the AMI head end 301, and thereby performs processing of implementing device registration in the AMI head end 301 that manages measurement information collection and supply-and-demand control (i.e. associating and registering the HEMS apparatus 101 and the meter apparatus 102). Specific communication process will be described later.

The communicator 116 performs processing of communicating with the out-home AMI head end 301 (on the Internet) and the in-home HEMS apparatus 101. Therefore, it is presumed that the meter apparatus 102 has a communication medium to communicate with the out-home apparatus and a communication medium to communicate with the in-home apparatus, as different communication media. For example, it may employ a configuration of realizing communication with the in-home apparatus by, for example, ZigBee that enables wireless PAN connection, and realizing communication with the out-home apparatus by FITH or GSM that enables WAN connection. Naturally, a configuration is possible in which only one communication medium is mounted to implement in-home and out-home connection.

Figure 3:
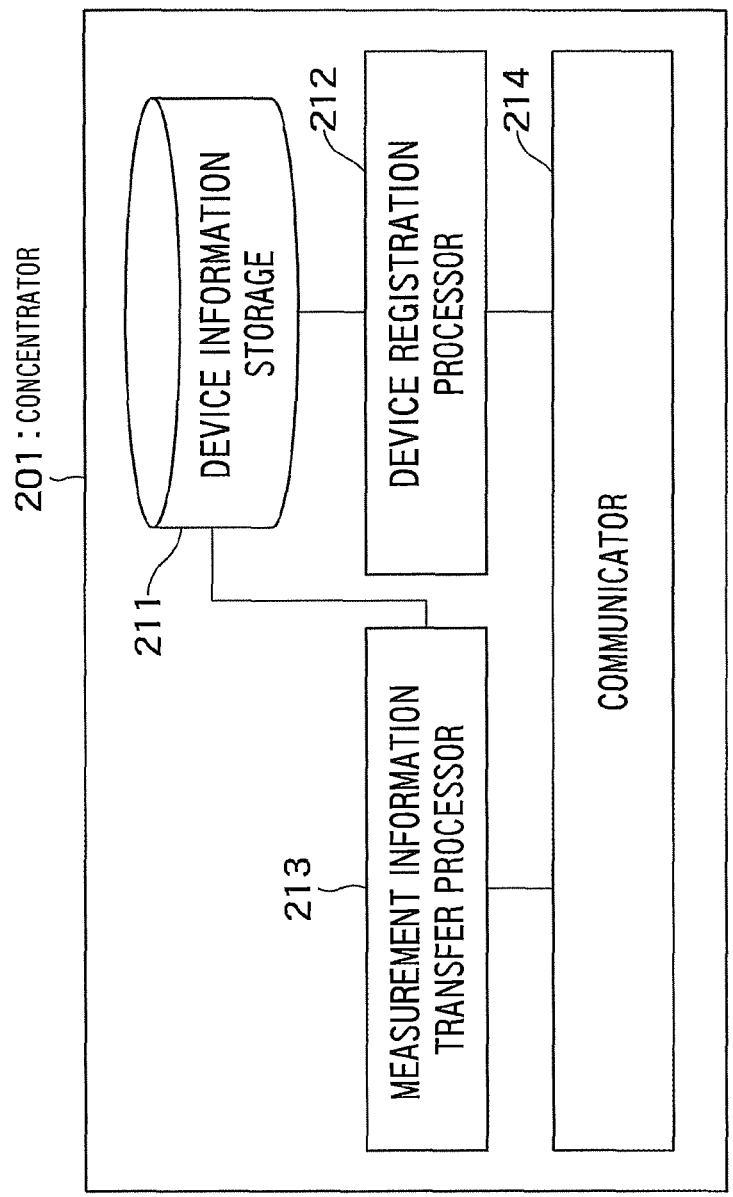
FIG. 3 illustrates a configuration diagram of a concentrator according to the first embodiment.

FIG. 3 is a diagram illustrating a configuration of the concentrator 201 according to the first embodiment. The concentrator 201 is configured with a device information storage 211, a device registration processor 212, a measurement information transfer processor 213 and a communicator 214. Also, a configuration example of the device information storage 211 will be illustrated in FIG. 8.

The concentrator 201 according to the first embodiment performs relay processing of measurement information transmitted by the meter apparatus 102. When the meter apparatus 102 performs out-home connection, in the case of using a BPL (Broadband over Power Line), a wireless WAN (Wide Area Network)/LAN (Local Area Network) or a wireless communication medium of a unique system, the concentrator 201 relays access to the Internet network.

The device information storage 211 of the concentrator 201 is realized with the same configuration as that of the device information storage 114 of the meter apparatus 102, that is, a configuration having route information of the ANSI C12.22 protocol. The example in FIG. 8 shows two items of route information leading to the meter apparatus 102 and the AMI head end 301.

Also, similar to the device registration processor 115 of the meter apparatus 102, the device registration processor 212 implements device registration according to the process of the ANSI C12.22 protocol. To be more specific, when the meter apparatus 102 transmits a device registration message including a device identifier to the AMI head end 301 on the Internet, the concentrator 201 updates the route information leading to the AMI head end 301 and the meter apparatus 102.

The measurement information transfer processor 213 relays a communication message between the meter apparatus 102 and the AMI head end 301, based on the route information of the device information storage 211. As described above, although the first embodiment has been described presuming that the meter apparatus 102 performs IP communication, in a case where the meter apparatus 102 performs communication in other methods than IP, the concentrator 201 temporarily terminates IP communication with the AMI head end 301 on the Internet and then converts it into a communication protocol that can be processed by the meter apparatus 102.

The communicator 214 is configured with a communication medium to communicate with the meter apparatus 102 in the customer's home and a communication medium to communicate with the AMI head end 301 on the Internet. For example, in a case where the meter apparatus 102 transmits measurement information using a wireless communication medium of a unique specification, the concentrator 201 has a wireless communication medium corresponding to the specification. Also, connection to the AMI head end 301 on the Internet may be realized by wired communication such as an optical fiber and ADSL (Asymmetric Digital Subscriber Line), but it is needless to say that it can be implemented even by wide-area wireless communication such as GSM.

Figure 4:
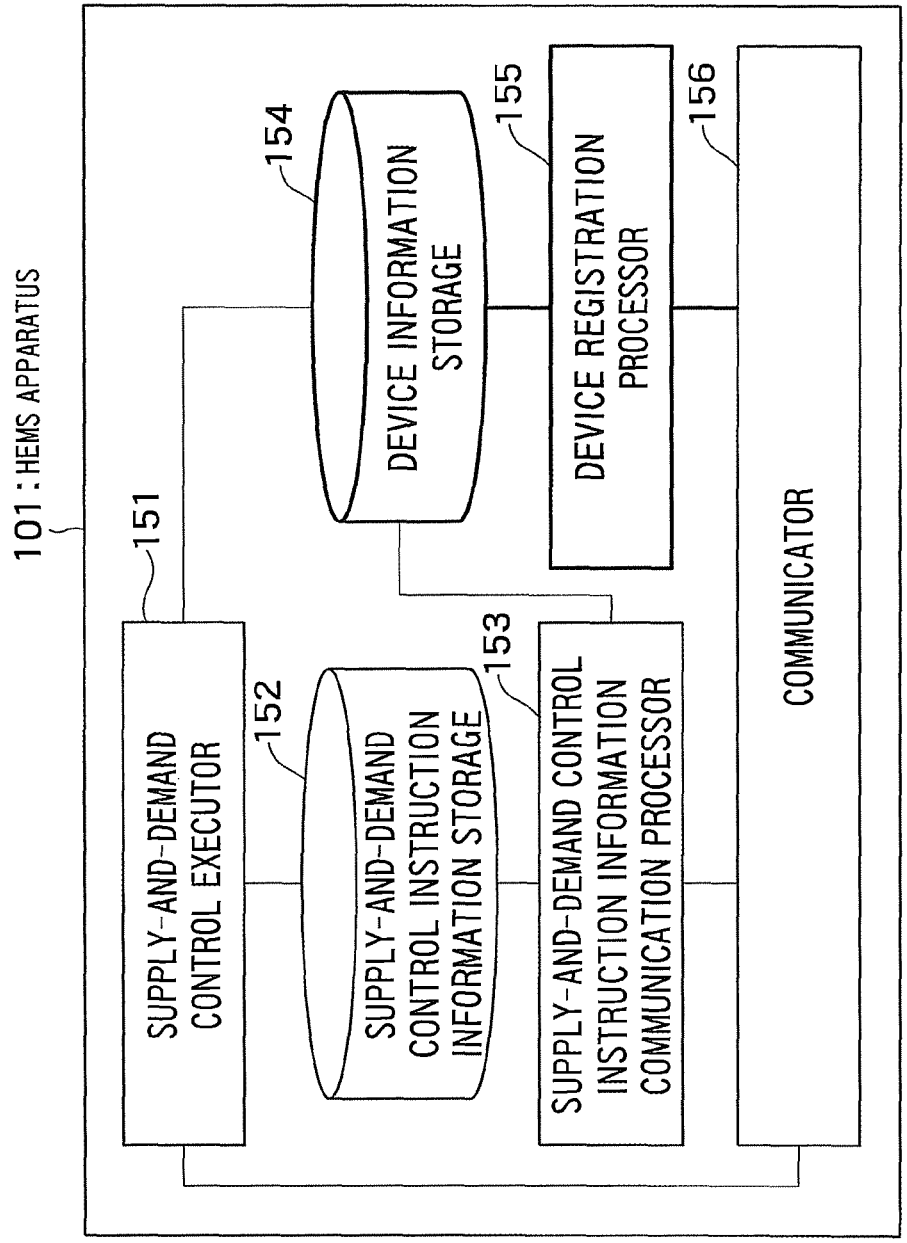
FIG. 4 illustrates a configuration diagram of an HEMS apparatus (i.e. energy management apparatus) according to the first embodiment.

FIG. 4 is a diagram illustrating a configuration of the HEMS apparatus 101 as an energy management apparatus according to the first embodiment. The HEMS apparatus 101 is configured with a supply-and-demand control executor 151, a supply-and-demand control instruction information storage 152, a supply-and-demand control instruction information communication processor 153, a device information storage 154, a device registration processor 155 and a communicator 156. Also, configuration examples of supply-and-demand control instruction information and the device information storage 154 are illustrated in FIG. 9 and FIG. 10.

The supply-and-demand control instruction information communication processor 153 obtains supply-and-demand control instruction information (i.e. energy control information) by receiving a supply-and-demand control instruction message transmitted from the AMI head end 301 on the Internet, and stores it in the supply-and-demand control instruction information storage 152.

The supply-and-demand control instruction information storage 152 is configured with, for example, a target electrical power value (in a watt unit) and expiration date of the customer's home as shown in FIG. 9. In addition to these, for example, charging information may be included.

In addition to a method of receiving the supply-and-demand control instruction message by periodically making a query to the AMI head end 301 by the HEMS apparatus 101, although there is a method of transmitting it to the HEMS apparatus 101 by the AMI head end 301 upon information generation, the first embodiment can be realized by any method.

Also, the HEMS apparatus 101 not only receives instruction information from the AMI head end 301 but also feeds back result information of supply-and-demand control processing to the AMI head end 301.

The supply-and-demand control instruction information communication processor 153 generates a communication message to be transmitted and analyzes a received communication message.

The supply-and-demand control executor 151 implements supply-and-demand control of operational state change for in-home household electrical appliances, based on content of the supply-and-demand control instruction information storage 152. To be more specific, it performs report processing such as an instruction for changing an operation of a PC (Personal Computer) or digital television from a normal state to a power saving state and an instruction for changing the temperature of an air conditioner or refrigerator. As a method of realizing such instructions, for example, there is a possible method of using an UPnP protocol for controlling a PC/AV (Audio Visual) device and an ECHONET protocol for controlling white goods such as an air conditioner and refrigerator. Also, although ZigBee includes an SEP (Smart Energy Profile) as a profile for electrical power control, similar control can be realized using the ZigBee SEP. However, in the first embodiment, processing in the supply-and-demand control executor 151 does not depend on a specific standard or protocol, and, furthermore, in a case where the HEMS function is directly mounted on a household electrical appliance, it may directly issue an instruction to a module inside the appliance not via the communicator 156.

As shown in FIG. 10, the device information storage 154 of the HEMS apparatus 101 is configured with content that is partly different from that of the meter apparatus 102 or concentrator 201. As described above, as a protocol for transmitting or receiving the measurement information of the meter apparatus 102, ANSI C12.22 is provided. However, in the standard, since there is no specific constitution related to a supply-and-demand control instruction from the AMI head end 301 on the Internet to the HEMS apparatus 101, there is a possible method of realizing an actual system by transmitting XML (eXtensible Markup Language) data represented by SOAP (Simple Object Access Protocol) in an HTTP (HyperText transfer Protocol) protocol. Also, as described above, regarding a supply-and-demand control instruction for in-home household electrical appliances from the HEMS apparatus 101, there are various realization methods such as a UPnP protocol, an ECHONET protocol and a ZigBee SEP protocol.

Therefore, the HEMS apparatus 101 in the first embodiment stores, in the device information storage 154, not only a device identifier but also, for example, information such as a protocol used by a device and a device type. The example of FIG. 10 shows a state where the meter apparatus 102 using the ANSI C12.22 protocol has a device identifier "P1.N1." Here, "P1.N1" is an example according to a notation method of an application layer device identifier in the ANSI C12.22 protocol. Regarding the meter apparatus 102 using the ANSI C12.22 protocol, route information is also recorded. Also, the device identifier of the AMI head end 301 using the HTTP protocol shows a state where an IP address of the device identifier in the network layer is provided. Regarding the IP address of the AMI head end 301, in addition to a method of setting it in a fixed manner at the time of shipping the HEMS apparatus 101, there is a possible method of dynamically obtaining it by making a query to a DNS (Domain Name System). Also, an example is provided where the air conditioner and the television in the example of FIG. 10 can be controlled by the HEMS apparatus 101 using the ZigBee SEP protocol. Here, ZigBee and ZigBee SEP define specifications higher than a data link layer, and it is assumed that a physical layer of a communication device supporting ZigBee uses the IEEE802.15.4 standard. In IEEE802.15.4, a unique 64-bit identifier is assigned upon shipment every RF (Radio Frequency) chip corresponding to an MAC (Medium Access Control) address in Ethernet. The embodiment will be explained based on an example case where the identifier is used as a device identifier in ZigBee. The example of FIG. 10 shows a state where two devices using the ZigBee SEP protocol have device identifiers of 0x0000000000000001 and 0x0000000000000002. In addition to this, although there is a method of using a 16-bit abbreviated address effective in a PAN (Personal Area Network), there may be a problem that identifier collision is caused between a plurality of devices. Also, regarding devices using the ZigBee SEP protocol, a control state of supply-and-demand control is equally managed.

Also, the device information storage 154 of the HEMS apparatus 101 in the first embodiment may manage a plurality of items of protocol information in one storage as described above or perform management with separate tables (or databases) for each protocol. In the latter case, it is not necessary to describe protocol information used by a device in a table. Also, to obtain the latest electrical power usage information from in-home meter apparatus 102, it is assumed that the HEMS apparatus 101 provides a data table based on the constitution of ANSI C12.29 together.

The device registration processor 155 of the HEMS apparatus 101 has a function of performing direct device registration in the AMI head end 301 on the Internet in addition to a function of performing device information registration (i.e. device registration instruction) with respect to the in-home meter apparatus 102. In addition to a method of realizing these functions by using the ANSI C12.22 protocol for both, there is a possible method of realizing these functions by using the ANSI C12.22 protocol for the in-home meter apparatus 102 and the HTTP protocol for the AMI head end 301 on the Internet.

The HEMS apparatus 101 in the first embodiment determines whether the own apparatus implements device registration or it gives a device registration instruction to the meter apparatus 102, based on information as to whether direct connection to the AMI head end 301 on the Internet is possible.

The communicator 156 is configured with at least a communication medium to connect to the in-home meter apparatus 102. As described above, although there are various connection forms of the meter apparatus 102 and the HEMS apparatus 101 with respect to the Internet network, if at least the HEMS apparatus 101 and the meter apparatus 102 can be connected to each other, it is possible to communicate with the AMI head end 301 on the Internet via the meter apparatus 102. That is, when the HEMS apparatus 101 cannot connect to the AMI head end 301, it is possible to perform all communication including reception of supply-and-demand control instruction information (i.e. energy control information)

via the meter apparatus 102. For example, if direct communication is possible, the supply-and-demand control instruction information (i.e. energy control information) is directly received from the AMI head end 301, and, if the direct communication is not possible, the information is received via the meter apparatus 102.

As a communication medium between the HEMS apparatus 101 and the meter apparatus 102, a wireless communication medium such as ZigBee and Bluetooth is possible, but it is possible to use a wired communication medium such as home PLC (Power Line Communication). In a case where the HEMS apparatus 101 provides a communication medium such as FTTH and GSM for connecting to an out-home apparatus in addition to a communication medium for connecting to the in-home meter apparatus 102, it is possible to directly transmit/receive a communication message to/from the AMI head end 301 on the Internet not via the meter apparatus 102.

Therefore, based on the information as to whether direct connection (or communication) with the AMI head end 301 is possible, the device registration processor 155 of the HEMS apparatus 101 determines to implement a device registration in the own apparatus if the direct connection is possible, and it determines to instruct the device registration to the in-home meter apparatus 102 if the direct connection is not possible.

To check the connectivity with the AMI head end 301, in addition to a method of using a conduction application such as ping, there is a possible method of actually establishing a communication connection with the AMI head end 301 by HTTP or the like and then performing decision. Alternatively, it may be possible to determine that direct connection (or communication) with the AMI head end 301 is possible in a case where the communicator 156 of the HEMS apparatus 101 is configured with a plurality of communication media for in-home and out-home connection, and it may be possible to determine that the direct connection (or communication) with the AMI head end 301 is not possible in a case where it is configured only with a single communication medium for in-home connection.

It should be noted that, in the first embodiment, association of communication media used for in-home connection and out-home connection is not limited to the above description example. For example, by increasing output electrical power depending on countries or regions using ZigBee that realizes wireless PAN connection between in-home apparatuses, its applicable use for communication between the meter apparatus 102 and the concentrator 201 is possible. Therefore, it is preferable that the HEMS apparatus 101 itself manage association information of communication media used for out-home connection and in-home connection.

Figure 5:
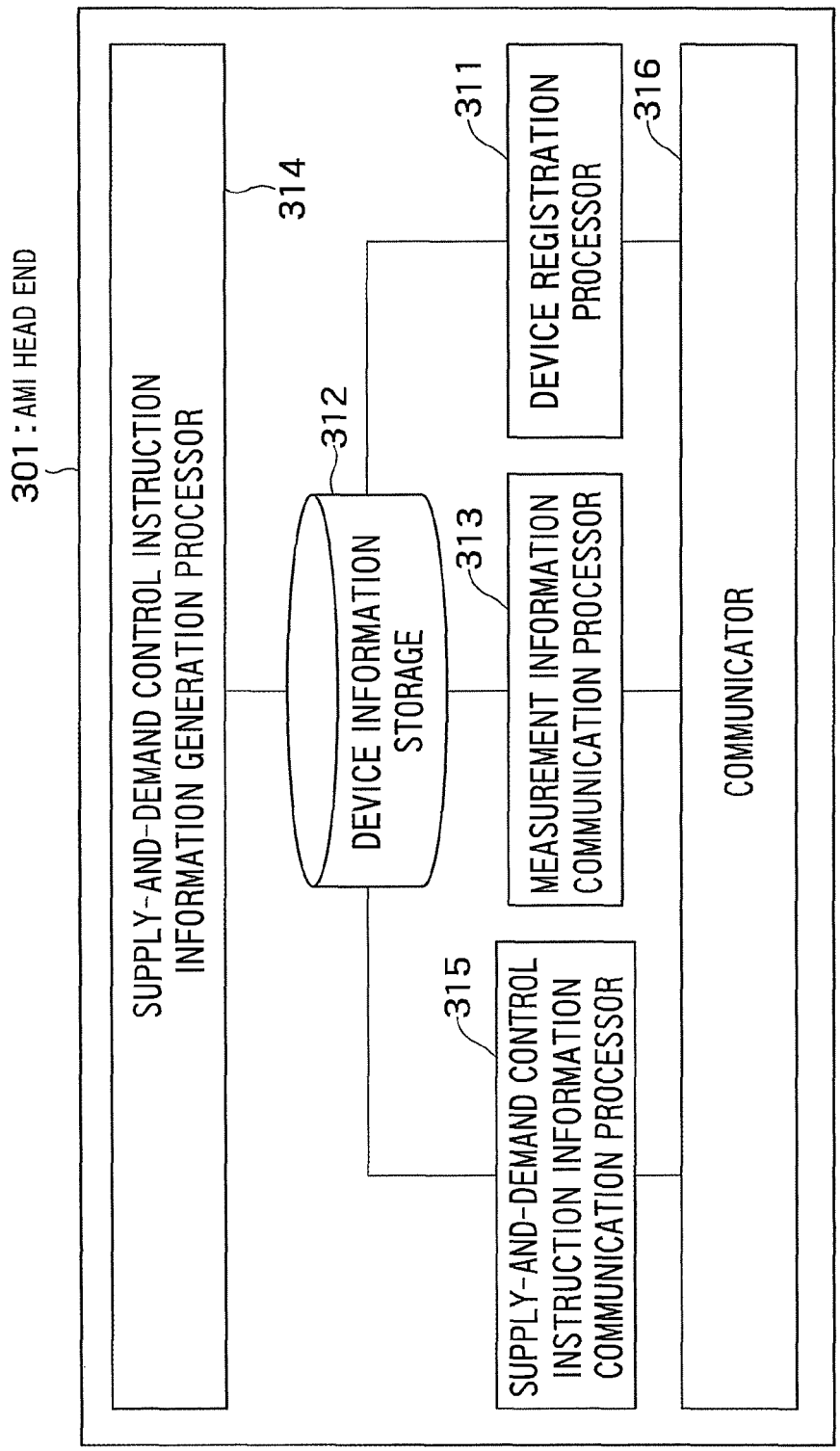
FIG. 5 illustrates a configuration diagram of an AMI head end according to the first embodiment.

FIG. 5 is a diagram illustrating a configuration of the AMI head end 301 according to the first embodiment. The AMI head end 301 has a device registration processor 311, a device information storage 312, a measurement information communication processor 313, a supply-and-demand control instruction information generation processor 314, a supply-and-demand control instruction information communication processor 315 and a communicator 316. Also, a configuration example of the device information storage 312 is illustrated in FIG. 11. The AMI head end 301 can be realized as, for example, a computing server apparatus.

The device registration processor 311 in the AMI head end 301 performs processing of registering device information of the meter apparatus 102 and the HEMS apparatus 101 installed in the customer's home. As described above, there is a possible method that, upon connection with the meter apparatus 102, communication according to the procedure of the ANSI C12.22 protocol is performed, and, upon connection with the HEMS apparatus 101, communication according to the procedure of the HTTP protocol is performed. Alternatively, there is a method of using the same communication protocol for connection between the meter apparatus 102 and the HEMS apparatus 101. The first embodiment is not limited to a communication protocol between the AMI head end 301 and an apparatus installed in the customer's home.

In the AMI head end 301, a configuration example of the device information storage 312 after a device registration of the meter apparatus 102 and the HEMS apparatus 101 in each customer's home is completed, is as shown in FIG. 11. In the example of FIG. 11, the meter apparatus 102 and the HEMS apparatus 101 are associated and managed for each customer. A group identifier denotes identification information that can uniquely identify a customer, and, for example, a construction worker of an electrical power provider initializes it as information to be uniquely associated with contract information when installing the meter apparatus 102 in the customer's home. Alternatively, by associating in advance the factory-default serial number of the meter apparatus 102 or the individual identifier of a communication medium with contract information and managing these, it is possible to omit the manual setting upon apparatus installation.

After that, if there arises a situation where the HEMS apparatus 101 or a household electrical appliance having the HEMS function is additionally added into the customer's home, after the AMI head end 301 is associated with the meter apparatus 102 installed in the same customer's home upon performing device registration processing of the HEMS apparatus 101, the same group identifier is assigned. There is a method of manually setting the group identifier to each apparatus using a display apparatus by the user, in this method, but, as described above, this method has a problem that, especially in a case where there are a large number of apparatuses, the usability degrades and it takes certain time or more from an apparatus setting to an operation start.

The above explanation illustrates an example case where the meter apparatus 102 is installed in the customer's home earlier than the HEMS apparatus 101, but, in its opposite procedure, that is, even in a case where the HEMS apparatus 101 is installed earlier than the meter apparatus 102, it is needless to say that it is applicable in the same way as in the first embodiment.

The example of FIG. 11 illustrates a state where the meter apparatus 102 and the HEMS apparatus 101 are installed in a customer's home of "UserID:A" and only the meter apparatus 102 is installed in a customer's home of "UserID:B." The meter apparatus 102 and the HEMS apparatus 101 communicate with the AMI head end 301 by the ANSI C12.22 protocol and the HTTP protocol, respectively. Also, an example case is described where the device identifier of the meter apparatus 102 is configured with an application layer identifier defined by the ANSI C12.22 protocol and the device identifier of the HEMS apparatus 101 is configured with an IP address corresponding to a network layer identifier and a MAC (Medium Access Control) address corresponding to a communication medium identifier in Ethernet. However, in the first embodiment, a device identifier configuration can be realized by another method such as a device serial number. Although the MAC address is the individual identifier of a communication medium, since there are a plurality of kinds of communication media in an actual system, it may be possible to generate and manage information combining identification information of communication media and individual identifiers of the communication media, for the purpose of preventing a collision between device identifiers. For example, regarding the device identifier of an HEMS apparatus having an Ethernet communication processor, it is expressed by, for example, "ETHERNET.00:00:00:00:00:01." Regarding a meter apparatus having a ZigBee communication processor in the same customer's home as that of this HEMS apparatus, it is possible to register identifier expressed as "ZIGBEE.00:00:00:00:00:00:00:01" in addition to an application layer identifier (P1.N1) in above ANSI C12.22. In any example, in addition to expression ways of "ETHERNET" and "ZIGBEE," it is possible to use the standard names of "IEEE802.3" and "IEEE802.15.4." Also, although the above is express in the way of dividing hex digits by colon (:), it is equally possible to apply "0x0000000000000001" in the same way as above. Although identifier expression may use a character string or a numerical value, the present embodiment does not depend on any method. That is, it needs not depend on a specific expression method as long as an identifier that can uniquely identify a device can be used for device registration.

The measurement information communication processor 313 of the AMI head end 301 collects measurement information of the meter apparatus 102 in the customer's home. To be more specific, using the ANSI C12.22 protocol, metering information transmission/reception between devices connected via a network is realized by a reading/writing request message to a data table defined by the ANSI C12.19 protocol.

The measurement information communication processor 313 obtains measurement information and updates information of a corresponding device in the device information storage 312. The example of FIG. 11 illustrates a state where information of accumulated electrical power value "X(W)" is collected from the meter apparatus 102 of device identifier "P1.N1" and information of accumulated electrical power value "Z(W)" is collected from the meter apparatus 102 of device identifier "P1.N2." Such storage of accumulated electrical power value information is realized by sequentially storing a plurality of items of information or sequentially performing overwriting at the time of collection. In the former case, it is preferable to store acquisition time information together.

The supply-and-demand control instruction information generation processor 314 in the AMI head end 301 generates supply-and-demand control instruction information based on usage electrical power information for each customer stored in the device information storage 312. To be more specific, for example, in the case of detecting that a certain household uses an electrical power amount over a contract value, supply-and-demand control is implemented by reporting a target electrical power value to the HEMS apparatus 101 of the household. In the example of FIG. 11, target electrical power value "Y(W)" is reported to the HEMS apparatus 101 installed in a customer's home of "UserID:A." In the example of the figure, it is assumed that "Y(W)" is a smaller value than "X(W)." Also, it may be possible to use a method of reporting target fee information instead of the target electrical power value.

When the supply-and-demand control instruction information is stored in the device information storage 312, the supply-and-demand control instruction information communication processor 315 generates and transmits a communication message directed to the corresponding HEMS apparatus 101. The supply-and-demand control instruction information communication processor 315 not only generates and transmits the communication message but also receives and analyzes the communication message. In the case of feedback-receiving of an execution result of supply-and-demand control from the HEMS apparatus 101, the AMI head end 301 generates a supply-and-demand control instruction based on the content again.

The communicator 316 is configured with a wired communication medium such as an optical fiber and Ethernet in order to access to the Internet network. Naturally, it is possible to use a wireless communication medium such as GSM.

It should be noted that, similar to the case of the device information storage 154 of the HEMS apparatus 101, the device information storage 312 of the AMI head end 301 can separate data tables for used protocols.

Also, a configuration is possible where AMI head ends 301 themselves are separately installed in an MDMS server and a DRMS server. In this case, the MDMS server is configured with the device information storage 312, the device registration processor 311, the measurement information communication processor 313 and the communicator 316. Also, the DRMS server is configured with the device information storage 312, the device registration processor 311, the supply-and-demand control instruction information generation processor 314, the supply-and-demand control instruction information communication processor 315 and the communicator 316.

In the case of separately providing the AMI head ends 301 in the MDMS server and the DRMS server, a form is possible where each of them accesses to the Internet network individually. In this case, the meter apparatus 102 in the customer's home connects (or communicates) with the MDMS server and the HEMS apparatus 101 connects (or communicates) with the DRMS server. Also, a form may be assumed where the device information storages 312 are separated as a DB server that can be commonly accessed by both servers.

Figure 12:
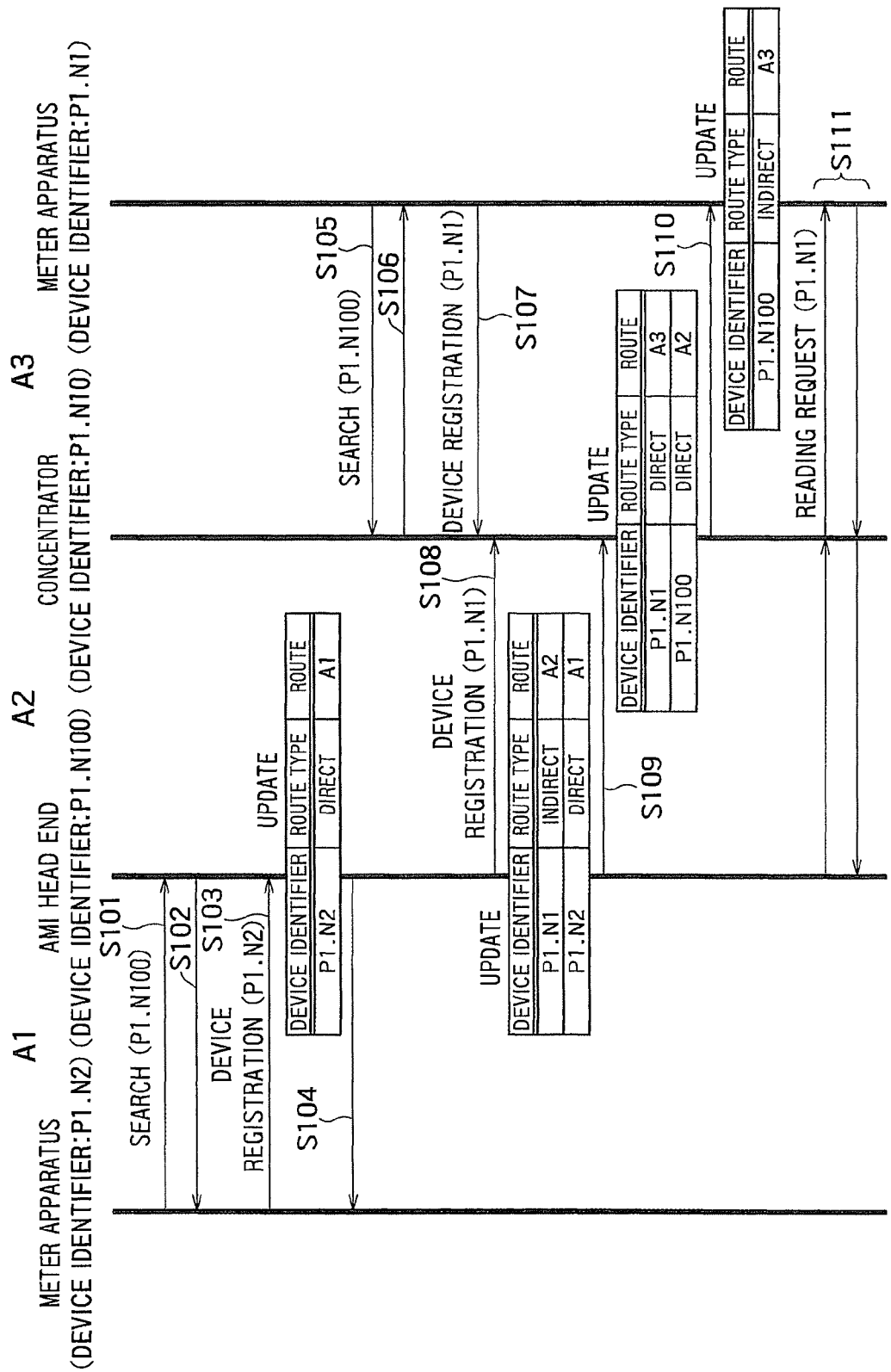
FIG. 12 illustrates an ANSI C12.22 device registration sequence according to the first embodiment.

FIG. 12 shows a communication sequence in a case where the meter apparatus 102 performs a device registration in the AMI head end 301. In FIG. 12, the meter apparatus 102 (P1.N2) is directly connected to the AMI head end 301 (P1.N100) and the meter apparatus 102 (P1.N1) is indirectly connected to the AMI head end 301 (P1.N100) via the concentrator 201 (P1.N10) as a relay apparatus. FIG. 12 shows a case where a communication sequence and route information between apparatuses are based on the procedure of the ANSI C12.22 protocol, but the first embodiment is equally applicable even in the case of using other communication protocols.

First, a device registration procedure of the meter apparatus 102 (P1.N2) directly connected to the AMI head end 301 will be explained.

The meter apparatus 102 (P1.N2) performs broadcast transmission of a search message for obtaining communication medium identifier information, in order to perform actual communication with the AMI head end 301 (P1.N100) (S101).

Configuration examples of the search message and search response message are shown in FIG. 15 and FIG. 16. The search message in FIG. 15 includes a device type and a device identifier. The device type denotes information for indicating the type of an apparatus that is the destination target of the search message. It designates a device type such as an "AMI head end" and "HEMS apparatus." In the example of FIG. 12, the meter apparatus 102 designates type information of the AMI head end as the device type of the search message in order to communicate with the AMI head end 301. It may be assumed that the device type is expressed by a numerical value or character string. Although content of the device information storage held in each apparatus or content of various communication messages can be configured with a numerical value or character string, the embodiment of the present invention is applicable using any method. The device identifier in FIG. 15 describes the device identifier of the destination target apparatus of the search message. In the example of FIG. 12, the meter apparatus 102 (P1.N2) transmits a search message including device identifier information of the AMI head end 301 (P1.N100). In a case where the device identifier of the destination apparatus is not clear, for example, it is possible to broadcast a search message describing "0" and forces a representative apparatus on the network to make a response. This can be assumed in a case where, for example, the concentrator 201 as a relay apparatus already recognizes the device identifier of the AMI head end 301 and the meter apparatus 102 does not recognize the device identifier of the AMI head end 301.

The AMI head end 301 (P1.N100) in FIG. 12 receives the search message from the meter apparatus 102 (P1.N2) and then replies a search response message in unicast (S102). As shown in FIG. 16, the search response message includes a device identifier and a communication medium identifier. In the device identifier of the search response message replied from the AMI head end 301 (P1.N100) in FIG. 12 to the meter apparatus 102 (P1.N2), the device identifier of the AMI head end 301 is described. Also, in the communication medium identifier, the MAC address (or IP address) of the AMI head end 301 is described. As described above, since the ANSI C12.22 protocol defines an application layer specification, an actual communication message is transmitted on other network layer protocols or data link layer protocol. In the example of FIG. 12, after obtaining the communication medium identifier of the search response message replied from the AMI head end 301 (P1.N100), the meter apparatus 102 (P1.N2) can perform unicast transmission of communication messages on the same network segment.

Next, the meter apparatus 102 (P1.N2) transmits a device registration message to the AMI head end 301 (P1.N100) (S103). FIG. 17 and FIG. 18 show configuration examples of the device registration message and a device registration response message. The device registration message includes a destination identifier, a transmission source identifier, a registration header and a registration device identifier. In the destination identifier, the device identifier of a destination apparatus of the registration message is described. In the transmission source identifier, the device identifier of a transmission source apparatus of the registration message is described. In the registration device identifier, it is possible to describe the device identifier of an apparatus to be registered in the destination apparatus and register it in a plurality of apparatuses at the same time. The registration header can be omitted in a case where there is a single registration device identifier, but it is used to show the count or separation of registration device identifiers in a case where there are a plurality of the same identifiers. In the example of FIG. 12, the meter apparatus 102 (P1.N2) generates and transmits a device registration message of destination identifier "P1.N100," transmission source identifier "P1.N2" and registration device identifier "P1.N2." After receiving the message, the AMI head end 301 (P1.N100) updates the route information of the device information storage and replies a device registration response message. As shown in FIG. 18, the device registration response message includes a destination identifier, a transmission source identifier and a registration result. The destination identifier and transmission source identifier of the device registration response message have the same meanings as those of the device registration message. The registration result is used to report a result as to whether a reception apparatus accepts the device registration message.

After updating the route information of the device information storage, the AMI head end 301 (P1.N100) in FIG. 12 describes information indicating registration success in a device registration response message and replies it (S104).

Meanwhile, for example, in the case of rejecting the device registration from the unauthorized meter apparatus 102, it does not update the route information and describes information indicating registration failure in a device registration response message and replies it.

After receiving the device registration response message, the meter apparatus 102 (P1.N2) implements metering information transmission/reception with the AMI head end 301, based on a reading/writing request message with respect to a data table defined by the ANSI C12.19 protocol. It should be noted that, although content of the device information storage or various communication messages can be configured with a numerical value or character string, the embodiment of the present invention is applicable using any method.

Even regarding a device registration of the meter apparatus 102 (P1.N1), it can be realized in the same framework as that of the meter apparatus 102 (P1.N2). However, the meter apparatus 102 (P1.N1) indirectly connects to the AMI head end 301 (P1.N100) via the concentrator 201 (P1.N10) that operates as a relay apparatus. When the meter apparatus 102 (P1.N1) performs broadcast transmission of a search message (S105), the concentrator 201 (P1.N10) replies a search response message (S106). "P1.N10" is described in the device identifier of the search response message and the individual identifier of a communication medium used by the concentrator 201 is described in the communication medium identifier. After receiving the search response message, the meter apparatus 102 (P1.N1) finds that, when a communication message is transmitted to the AMI head end 301, it needs to pass through the concentrator 201 (P1.N10). Although it is omitted in FIG. 12, the meter apparatus 102 (P1.N1) reflects route information related to the concentrator 201 (P1.N10) onto the own device information storage. After that, the meter apparatus 102 (P1.N1) generates and transmits a device registration message of registration device identifier "P1.N1" for the AMI head end 301 (P1.N100) (S107). The concentrator 201 (P1.N10) transfers the message to the AMI head end 301 (P1.N100) based on the route information of the device information storage (S108). After receiving the device registration message, the AMI head end 301 (P1.N100) updates the route information of the device information storage and replies a device registration response message (S109). Upon transferring the device registration response message, the concentrator 201 (P1.N10) also updates route information of the own device information storage. Finally, when receiving the device registration response message (S110), the meter apparatus 102 (P1.N1) reflects route information leading to the AMI head end 301 (P1.N100), to the own device information storage. When such device registration procedure is finished, the meter apparatus 102 (P1.N1) and the AMI head end 301 (P1.N100) implement metering information transmission/reception according to the reading/writing request procedure defined by the ANSI C12.22 protocol with respect to the data table defined by the ANSI C12.19 protocol (S111).

The device procedure of the HEMS apparatus 101 according to the first embodiment will be explained using FIG. 13 and FIG. 14.

Figure 13:
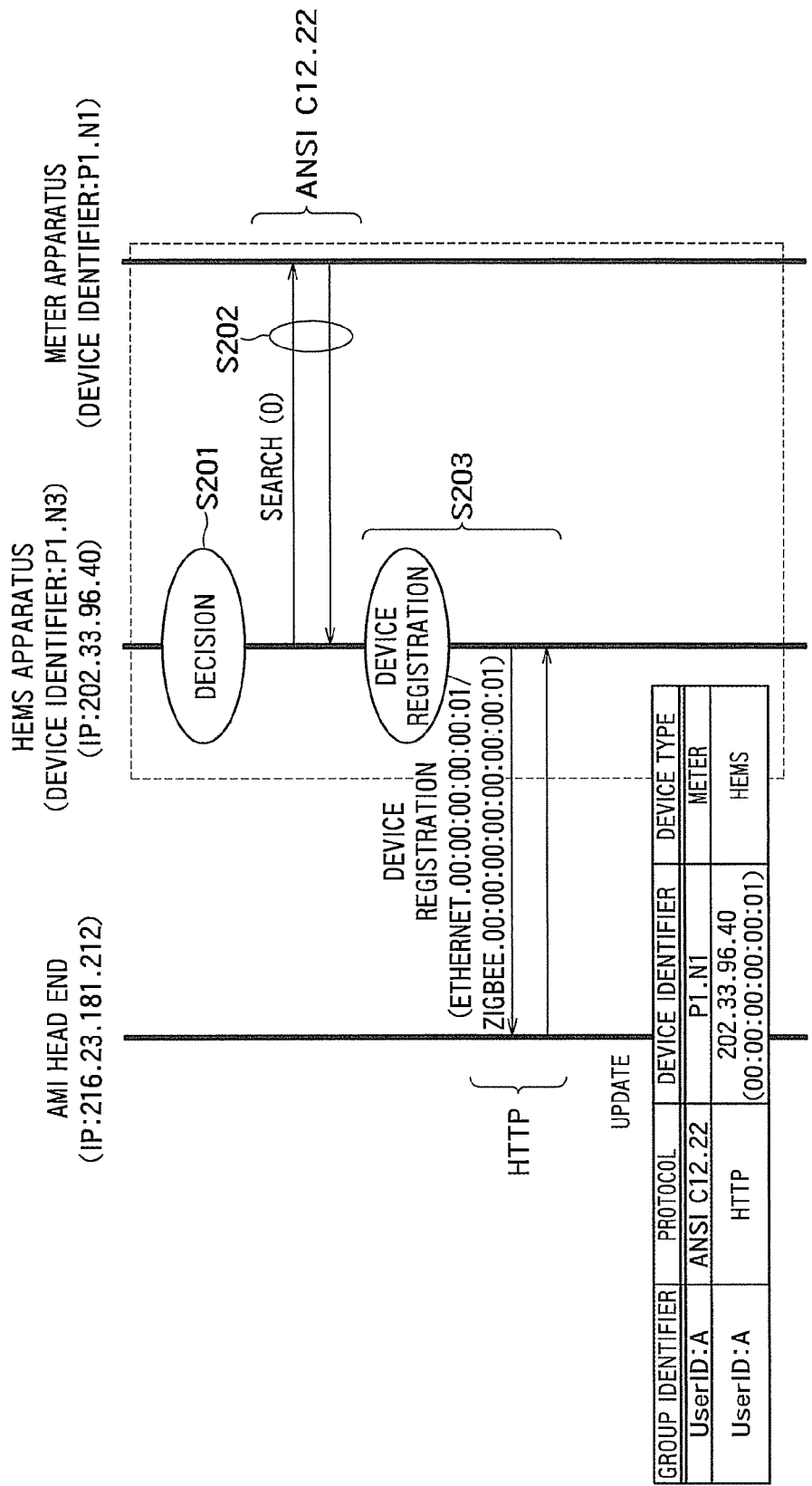
FIG. 13 illustrates a device registration sequence of the HEMS apparatus according to the first embodiment.
Figure 14:
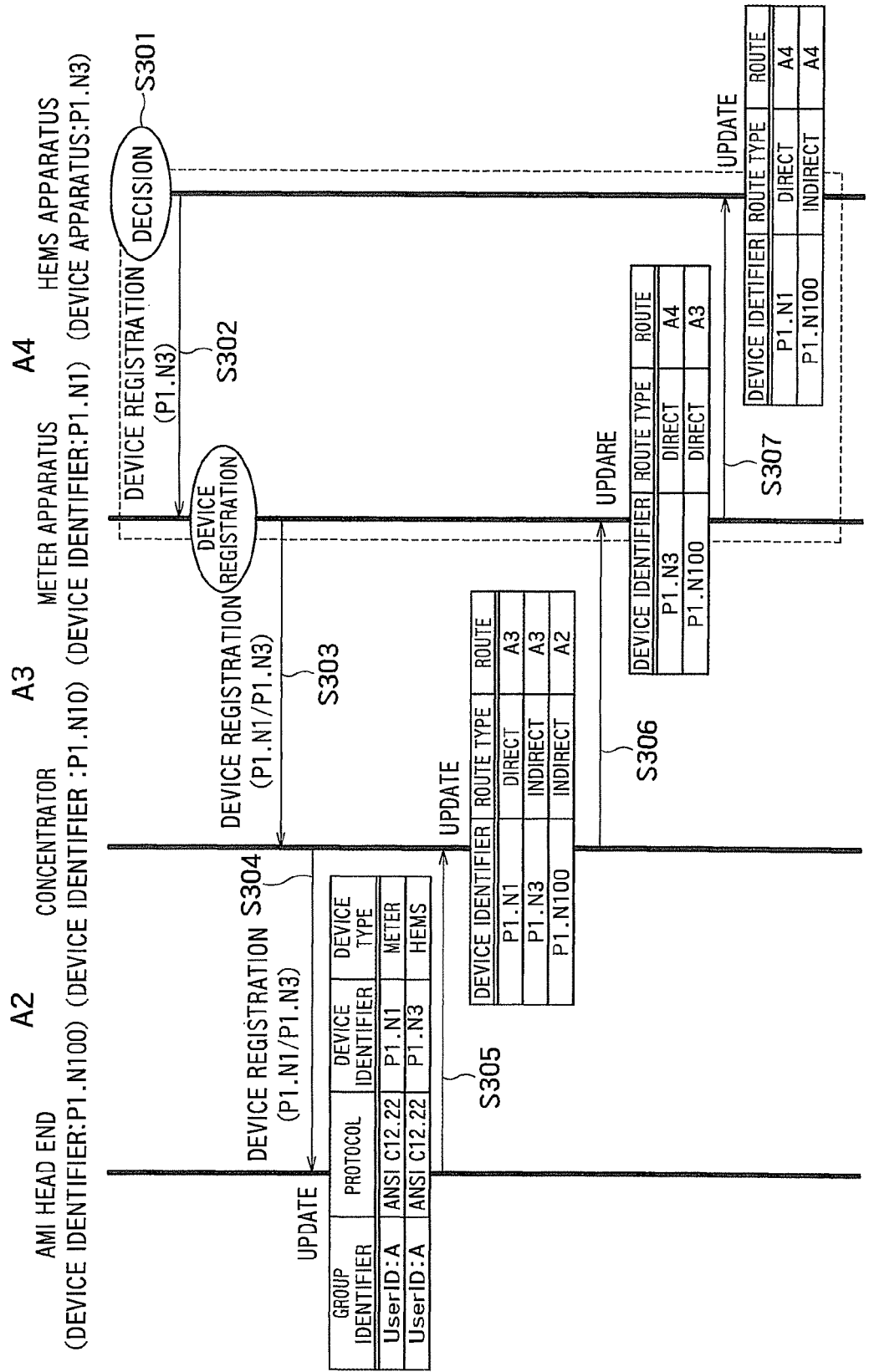
FIG. 14 illustrates a device registration sequence of the meter apparatus according to the first embodiment.

The HEMS apparatus 101 determines whether the own apparatus can directly connect to the AMI head end 301 server (S201 in FIG. 13 and S301 in FIG. 14). To check the connectivity with the AMI head end 301, in addition to a method of using a conduction application such as ping, there is a possible method of actually establishing a communication connection with the AMI head end 301 by HTTP or the like and then performing decision. Alternatively, it may be possible to determine that direct connection with the AMI head end 301 is possible in a case where the communicator of the HEMS apparatus 101 is configured with a plurality of communication media for in-home and out-home connection, and it may be possible to determine that the direct connection with the AMI head end 301 is not possible in a case where it is configured only with a single communication medium for in-home connection. FIG. 13 shows a communication sequence in a case where the connection is determined to be possible, and FIG. 14 shows a communication sequence example in a case where the connection is determined to be impossible.

In the example of FIG. 13, it is assumed that the HEMS apparatus 101 has an ANSI C12.22 protocol processing function for communicating with the in-home meter apparatus 102 and an HTTP protocol processing function for communicating with the out-home AMI head end 301 server. In a case where the HEMS apparatus 101 determines that the own apparatus can directly connect to the AMI head end 301, it performs processing of obtaining the device identifier of the meter apparatus 102 (S202). To be more specific, for example, based on transmission/reception of the above-described search message and search response message, it obtains the application layer device identifier of the meter apparatus 102 defined by the ANSI C12.22 protocol. Alternatively, information such as the individual identifier or serial number of a communication medium used by the meter apparatus 102 can be obtained as a device identifier. The HEMS apparatus 101 obtains information such as the individual identifier (i.e. MAC address) or serial number of a communication medium used by the own apparatus, as the device identifier of the apparatus. Alternatively, it may be possible to obtain an application layer identifier defined by the ANSI C12.22 protocol, as a device identifier. In a case where the HEMS apparatus 101 has a plurality of communication media, it may be possible to use information of one of the communication media or information of all communication media.

Figure 19:
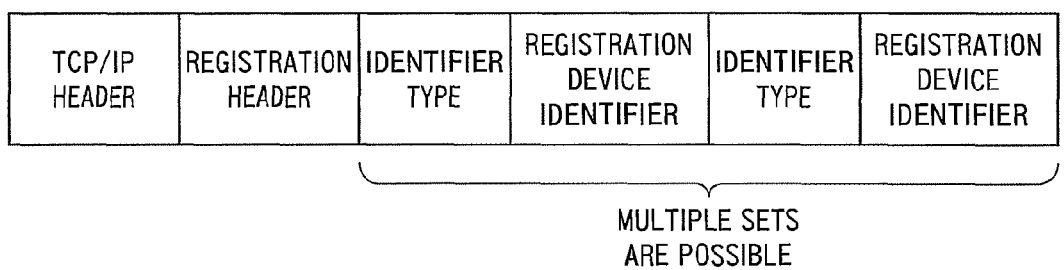
FIG. 19 illustrates a configuration example of a device registration message according to the first embodiment.

After obtaining the device identifiers of the own apparatus and the meter apparatus 102, the HEMS apparatus 101 implements a device registration in the AMI head end 301 (S203). FIG. 19 shows a configuration example of a device registration message transmitted from the HEMS apparatus 101 to the AMI head end 301. The device registration message transmitted by the HEMS apparatus 101 includes a TCP/IP header, a registration header, an identifier type and a registration device identifier. The TCP/IP (Transmission Control Protocol/Internet Protocol) header denotes control information for performing IP communication between the HEMS apparatus 101 and the AMI head end 301. The identifier type denotes information for determining whether a subsequent registration device identifier is an application identifier by the ANSI C12.22 protocol, the IP address of a network layer identifier or an MAC address that is a communication medium identifier. The registration header can be omitted in a case where there is a single registration device identifier, but it is used to show the count or separation of registration device identifiers in a case where there are a plurality of the same identifiers. Although the device registration message configuration in FIG. 19 can be realized by a numerical value, character string or XML, the embodiment does not depend on each configuration.

When the device registration by the HEMS apparatus 101 is completed, information of application layer device identifier "P1.N1" related to the meter apparatus 102, network layer device identifier (or IP address) "202.33.96.40" related to the HEMS apparatus 101 and communication medium device identifier (or MAC address) "00:00:00:00:00:01" is reflected to the device information storage of the AMI head end 301. In a case where the device information storage of the AMI head end 301 stores a plurality of items of device identifier information, it is preferable to store the device identifier types together. As the device identifier of the meter apparatus, as described above, it is possible to use identification information based on the communication medium type and individual identifier. In addition to the application layer identifier (P1.N1) of ANSI C12.22, it is possible to register "ZIGBEE.00:00:00:00:00:00:00:01" as a device identifier. In this way, in the case of using the communication medium device identifier, that is, in the case of using individual identifier information of the communication medium, it is assumed that, taking into account a collision between a plurality of identifiers, an identifier generated by both type information of the communication medium and the individual identifier of the communication medium is used. In the case of HEMS, it is expressed as "ETHERNET.00:00:00:00:00:01." However, as described above, the embodiment does not depend on a specific expression method. It is equally possible to perform a device registration using a combination of both the application layer identifier and the communication medium device identifier.

It should be noted that, although FIG. 13 illustrates an example case where the HEMS apparatus 101 performs transmission by the HTTP protocol, for example, it can be realized by performing transmission by the ANSI C12.22 protocol. In this case, it is assumed that the AMI head end 301 stores an application layer identifier defined by the ANSI C12.22 protocol as the device identifiers of the meter apparatus 102 and the HEMS apparatus 101.

Further, the HEMS apparatus 101 needs not necessarily have an IP communication processing function, and, for example, in a case where wireless communication by GSM is performed, it may be possible to transmit/receive information by directly calling the AMI head end 301. Regarding the communication medium or communication protocol used by each apparatus and access to the Internet network, the first embodiment does not depend on a specific form and is applicable in the same framework.

FIG. 14 shows a communication sequence related to device registration in a case where the HEMS apparatus 101 determines that direct connection with the AMI head end 301 is impossible. In a case where the HEMS apparatus 101 determines that direct connection with the AMI head end 301 is impossible (S301), the HEMS apparatus 101 transmits/receives a communication message by the ANSI C12.22 protocol to communicate with the in-home meter apparatus 102, and the HEMS apparatus 101 implements a device registration in the meter apparatus 102 (S302). To be more specific, a device registration message describing device identifier "P1.N3" of the own apparatus in the registration device identifier is transmitted. The meter apparatus 102 installed in the customer's home is generally positioned as a terminal apparatus related to communication with the AMI head end 301 on the Internet.

In the case of receiving the device registration message from the in-home HEMS apparatus 101, the meter apparatus 102 generates and transmits a device registration message including the device identifier of the own apparatus and the device identifier of the HEMS apparatus 101, for the AMI head end 301 (S303). As shown in FIG. 14, the device registration message generated by the meter apparatus 102 includes a plurality of items of registration device identifier information, that is, device identifier "P1.N1" of the meter apparatus 102 and device identifier "P1.N3" of the HEMS apparatus 101. To associate the meter apparatus 102 and the HEMS apparatus 101 installed in the same customer's home with the AMI head end 301, a device registration message including both information is generated regardless of whether a registration of the meter apparatus 102 is already completed. Also, in the example of FIG. 14, although the meter apparatus 102 performs a device registration in the AMI head end 301 according to the procedure of the ANSI C12.22 protocol, it can be equally realized even by the HTTP protocol like the device registration by the HEMS apparatus 101 in FIG. 13. As described above, the first embodiment does not depend on the communication medium and communication protocol used by each apparatus.

The device registration message transmitted for the AMI head end 301 is relayed by the concentrator 201 and delivered to the AMI head end 301 (S304), and, via the same sequence (S305 and S306) as in FIG. 12, the device information storages of the AMI head end 301, the concentrator 201 and the meter apparatus 102 are updated as shown in the figure. Further, a response message for the device registration message transmitted in step S302 is received in the HEMS apparatus 101 (S307) and the device information storage of the HEMS apparatus 101 is updated as shown in the figure.

Figure 21:
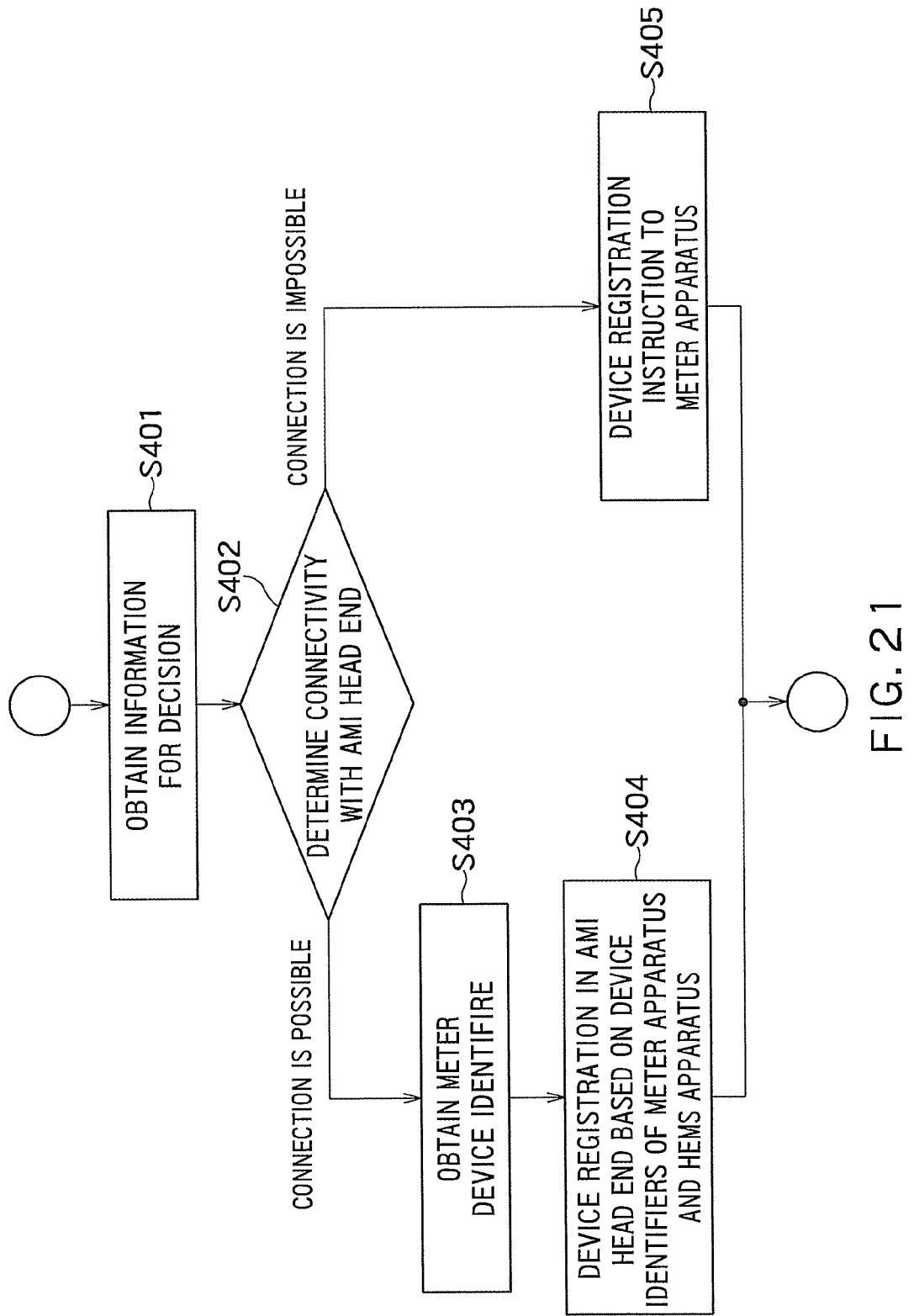
FIG. 21 illustrates an operation flowchart of the HEMS apparatus according to the first embodiment.

FIG. 21 is a diagram illustrating a processing flowchart of the HEMS apparatus 101 according to the first embodiment. An HEMS function can be directly mounted on the meter apparatus 102 or each household electrical appliance.

The HEMS apparatus 101 obtains decision information for determining whether direct connection with the AMI head end 301 is possible (S401), and determines whether the direct connection is possible (S402). If it is possible, a device identifier is obtained from the meter apparatus 102 (S403) and a device registration message including the device identifiers of the meter apparatus 102 and the HEMS apparatus 101 is transmitted to the AMI head end 301 (S404). By this means, the HEMS apparatus 101 and the meter apparatus 102 are associated and subjected to device registration in the AMI head end 301. By contrast, if the direct connection is not possible, the meter apparatus 102 is instructed to perform a device registration instead (S405).

Figure 22:
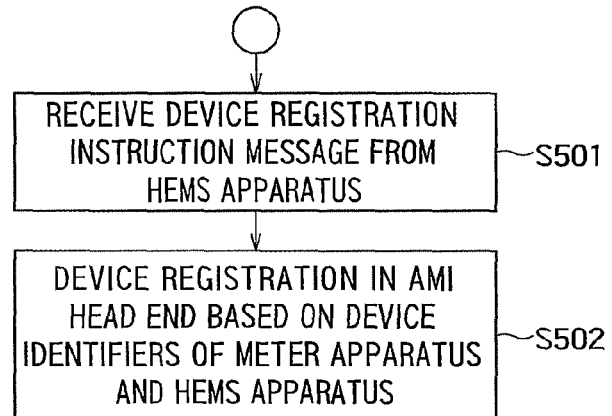
FIG. 22 illustrates an operation flowchart of the meter apparatus according to the first embodiment.

FIG. 22 is a diagram showing a processing flowchart of the meter apparatus 102 according to the first embodiment. The meter apparatus 102 receives, from the HEMS apparatus 101, a device registration message according to the procedure of the ANSI C12.22 protocol or a separately-defined device registration instruction message including the device identifier of the HEMS apparatus 101 (S501). When receiving the message, the meter apparatus 102 generates a device registration message based on the device identifiers of the meter apparatus 102 and the HEMS apparatus 101, and transmits it to the AMI head end 301 (S502). By this means, in the AMI head end 301, the HEMS apparatus 101 and the meter apparatus 102 are associated and subjected to device registration.

Figure 20:
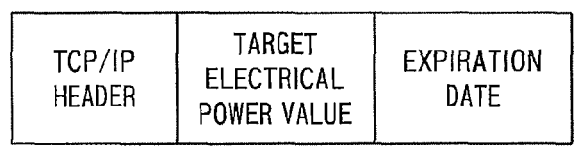
FIG. 20 illustrates a configuration example of a supply-and-demand control instruction message according to the first embodiment.
Figure 23:
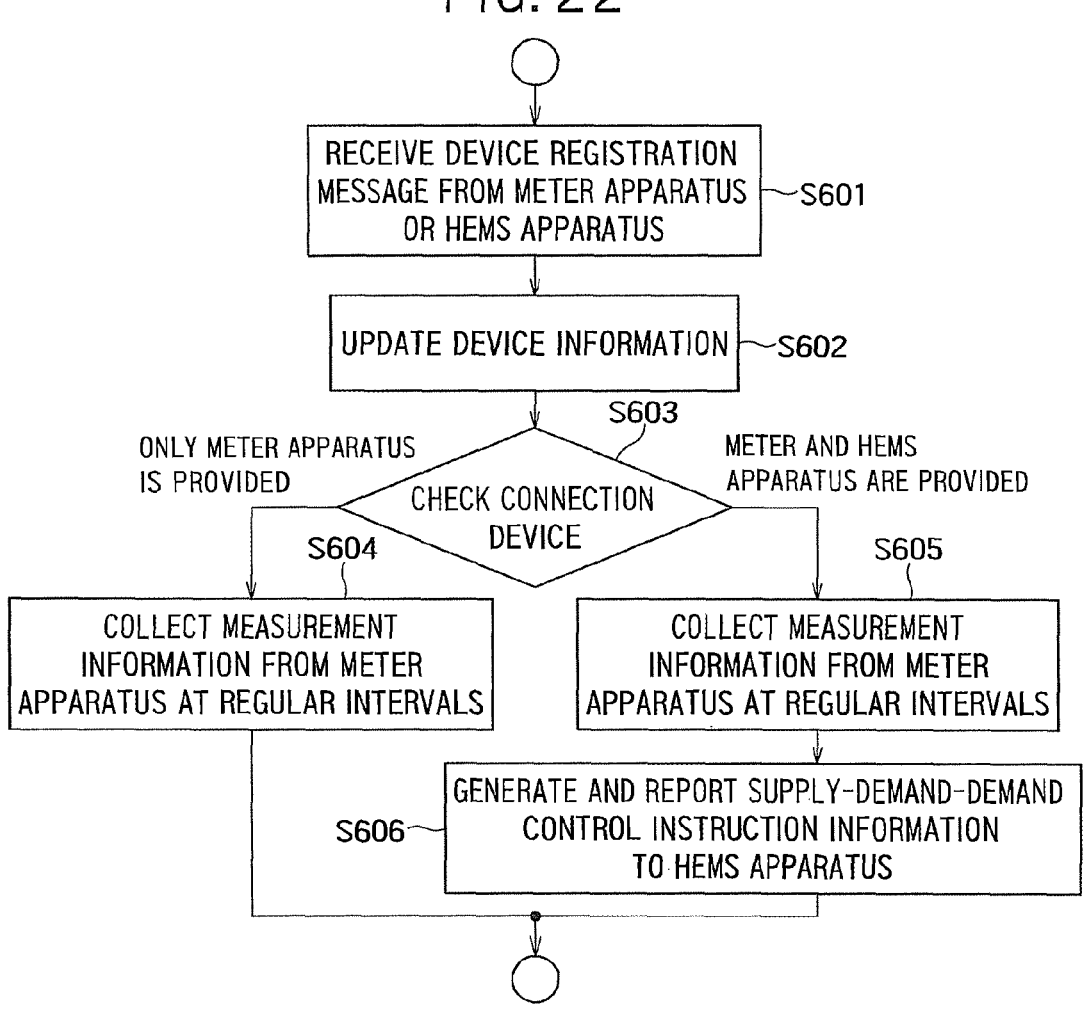
FIG. 23 illustrates an operation flowchart of the AMI head end apparatus according to the first embodiment.

FIG. 23 is a diagram showing a processing flowchart of the AMI head end 301. When receiving a device registration message from the meter apparatus 102 or the HEMS apparatus 101 (S601), the AMI head end 301 performs a device registration based on the device registration message (S602). In a case where only the meter apparatus 102 is provided as a registration device (i.e. in a case where the meter apparatus 102 is provided as a connection device), the AMI head end 301 periodically collects measurement information from the meter apparatus 102 (S604). In a case where the meter apparatus 102 and the HEMS apparatus 101 are both provided as registration devices, the AMI head end 301 periodically collects measurement information from the meter apparatus 102 (S605), generates supply-and-demand control instruction information (such as a target electrical power value and expiration date), includes the generated supply-and-demand control instruction information in the supply-and-demand control instruction message as shown in FIG. 20 and reports it to the HEMS apparatus 101 associated with the meter apparatus (S606).

Thus, according to an energy management apparatus (i.e. HEMS apparatus 101) of the first embodiment, by determining a main apparatus that performs a device registration from connection possible/impossible information with respect to a server (i.e. AMI head end 301) on the Internet, it is possible to suppress a load of the communication amount and the processing amount and associate a pair of the meter apparatus 102 and the HEMS apparatus 101 in a customer's home on the server side.

(Second Embodiment)

The second embodiment realizes a secure device registration that ensures the confidentiality, the completeness and the availability. Similar to the first embodiment, it is a precondition that the system according to the second embodiment adopts the configuration of FIG. 1. In the first embodiment, when the meter apparatus 102 and the HEMS apparatus 101 installed in a customer's home perform a device registration for the AMI head end 301 on the Internet, communication message encryption and authentication between apparatuses are not taken into account. Therefore, for example, there may arise problems that a third person other than normal customers making a contract with an electrical power provider pretends to be a normal customer and transmits/receives unauthorized information to/from the AMI head end 301; personal information on a communication route is stolen; and the whole system breaks down due to DoS (Denial of Service) for the AMI head end 301. Therefore, it is necessary to ensure the confidentiality, the completeness and the availability by encrypting a communication message conveyed on the Internet or performing authentication between the AMI head end 301 and each apparatus in a customer's home.

According to description of the ANSI C12.22 protocol, by sharing a plurality of encryption key candidates in advance between apparatuses connected via a network and transmitting an encrypted communication message together with identification information specifying an encryption key, it is possible to perform decoding processing on the receiving apparatus side. However, the ANSI C12.22 protocol denotes a communication protocol focusing on the meter apparatus 102, and regarding the setting shared by the AMI head end 301 and the meter apparatus 102, in addition to a method of setting it in a fixed manner at the time of shipment, for example, there is a possible method where a construction worker of an electrical power provider performs the setting when installing the meter apparatus 102 in the customer's home. In the former method, an encryption key is shared between all shipped meter apparatuses 102, and therefore there is a problem that, in a case where encryption key information is leaked, there is a high risk that an unauthorized third person steels a communication message. On the other hand, in the latter method, a construction worker of an electrical power provider that manages the AMI head end 301 can subjectively assign an encryption key and authentication information for each meter apparatus 102. Here, the encryption key denotes information for encrypting communication messages such as a common key and a public key to realize the confidentiality. The authentication information denotes information for authenticating a normal user or a device such as an ID, a password and a digital certificate. By adequately combining and using the encryption key and the authentication information, it is possible to realize the confidentiality, completeness and availability of communication messages transferred between the AMI head end 301 and each apparatus in the customer's home.

However, as described in the first embodiment, in addition to the meter apparatus 102, the HEMS apparatus 101 and a household electrical appliance having the HEMS function may be installed in a customer's home. Generally, unlike the meter apparatus 102 that can be subjectively managed by an electrical power provider, it can be assumed that the setting of the HEMS apparatus 101 or a household electrical appliance having the HEMS function is performed by the customer (or user) himself/herself. Therefore, unlike the case of the meter apparatus 102, it is difficult to encrypt communication messages related to device registration at the time of initial setting and transmit or receive them while sharing an encryption key in advance between the AMI head end 301 and the HEMS apparatus 101.

A device registration message may include personal information of a customer making a contract with an electrical power provider in addition to an apparatus device identifier, and therefore it is important to encrypt the device registration message. Also, by using an encryption key shared with the AMI head end 301 in advance, it is possible to authenticate that the apparatus is installed in a normal customer's home.

It should be noted that, regarding communication message encryption and authentication between the AMI head end 301 and the apparatuses in the customer's home, in addition to the above ANSI C12.22 protocol, there are a plurality of VPN (Virtual Private Network) techniques such as IPsec (Security Architecture for Internet Protocol), PPTP (Point to Point Tunneling Protocol), SSL (Secure Sockets Layer) and SSH (Secure Shell). By using these techniques, in addition to strong encryption, it is possible to implement highly reliable authentication using a digital certificate.

However, since the meter apparatus 102 that is realized as an embedded device generally has a poor processing ability, it is preferable to avoid VPN processing alternatives for multiple apparatuses as much as possible to suppress an increase of load and it is preferable to use a simple method such as the above ANSI C12.22 protocol.

Especially, regarding a device registration message including encryption and authentication information, it is assumed that a secure device registration of the HEMS apparatus 101 is realized by mediating the meter apparatus 102 for all communication between the HEMS apparatus 101 installed in the customer's home and the AMI head end 301. However, as described above, the meter apparatus 102 is highly likely to have a poor processing ability, and, consequently, if even a communication message that can be directly transmitted from the HEMS apparatus 101 to the AMI head end 301 is encrypted and relayed, there arises a problem that a significant load increase is caused in the processing amount of the meter apparatus 102 and, furthermore, a delay increase is caused due to transmission in a redundant communication route.

The second embodiment is made to solve the above problems and can provide an advantage that, in various connection forms of the meter apparatus 102 and the HEMs apparatus 101 with respect to the Internet network, it is possible to ensure the security such as the confidentiality, the completeness and the availability while encrypting and authenticating a communication message related to device registration to be transmitted/received to/from the AMI head end 301 on the Internet.

Figure 24:
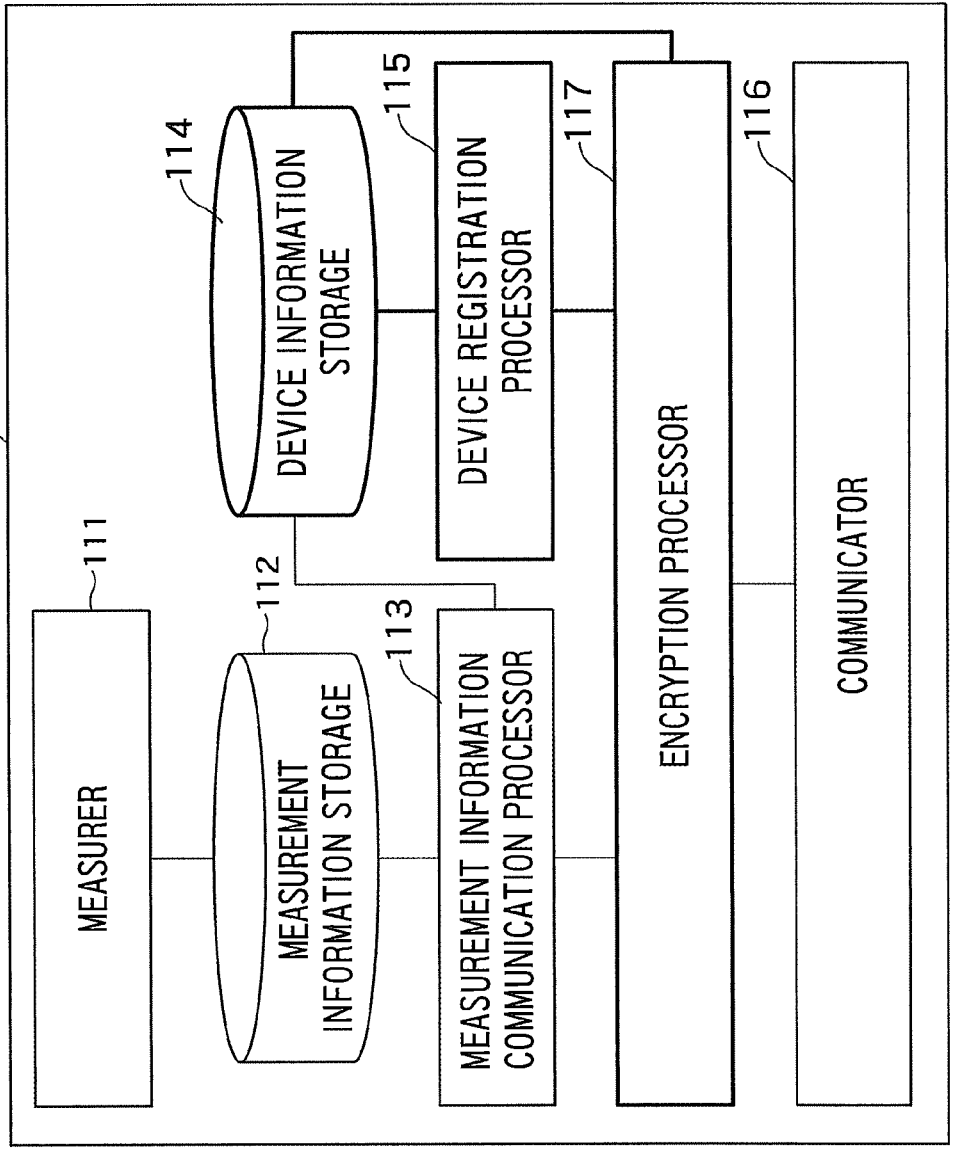
FIG. 24 illustrates a configuration diagram of a meter apparatus according to a second embodiment.
Figure 25:
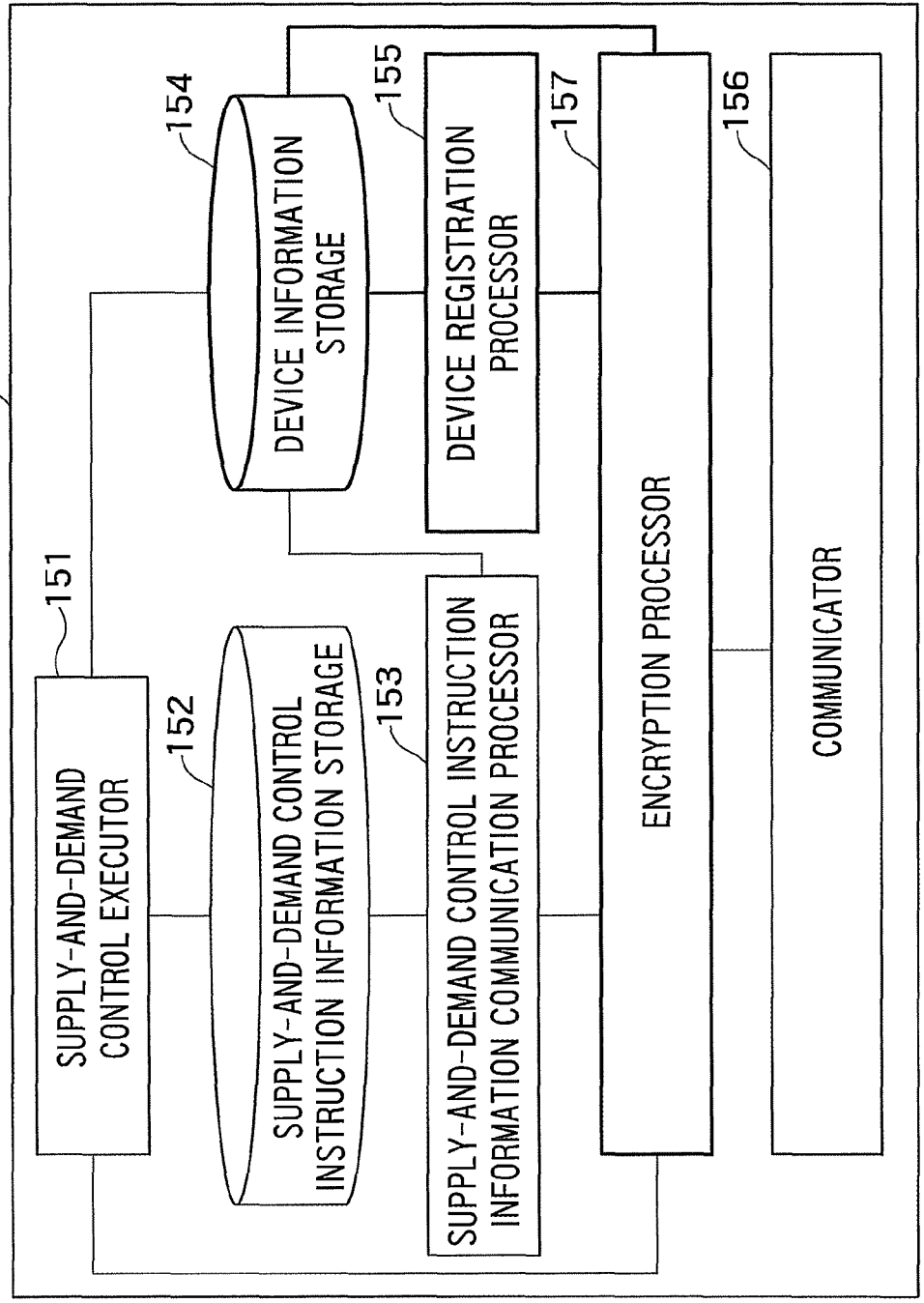
FIG. 25 illustrates a configuration diagram of an HEMS apparatus according to the second embodiment.
Figure 26:
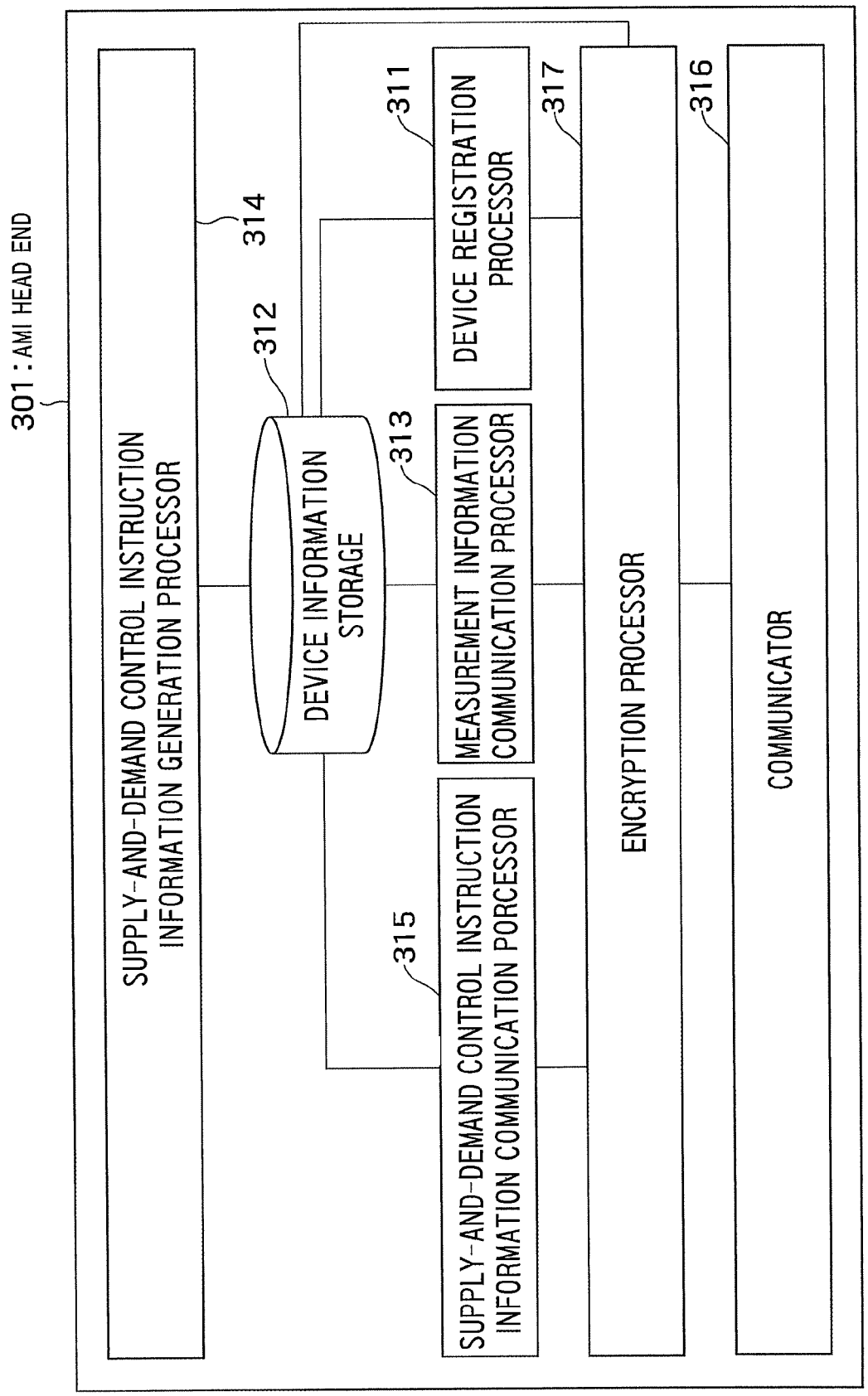
FIG. 26 illustrates a configuration diagram of an AMI head end apparatus according to the second embodiment.

Apparatus configurations of the meter apparatus 102, the HEMS apparatus 101 and the AMI head end 301 according to the second embodiment are shown in FIG. 24, FIG. 25 and FIG. 26. The apparatuses of the second embodiment further have encryption processors 117, 157 and 317 for the apparatuses of the first embodiment, respectively. The encryption processors 117, 157 and 317 realize encryption processing and authentication processing of communication messages such as the ANSI C12.22 protocol, IPsec, PPTP, SSL and SSH.

Also, as shown in FIG. 27, FIG. 28 and FIG. 29, the meter apparatus 102, the HEMS apparatus 101 and the device information storages 114, 154 and 312 of the AMI head end 301 further have encryption key information for encrypting communication messages. Although it is not illustrated, in addition, they may have authentication information such as a digital certificate and a session start ID (Identifier) in the ANSI C12.22 protocol.

The device information storage 114 of the meter apparatus 102 according to the second embodiment has encryption key information of the own apparatus (i.e. first encryption key) and encryption key information of the in-home HEMS apparatus 101 (i.e. second encryption key) (see FIG. 27). As described above, further, it may have authentication information such as a digital certificate used by the HEMS apparatus 101 and a session start ID (Identifier) in the ANSI C12.22 protocol.

Similar to the case of the first embodiment, if the HEMS apparatus 101 cannot directly connect to the AMI head end 301 on the Internet, the apparatus gives a device registration instruction to the in-home meter apparatus 102. As described in the first embodiment, the device registration instruction may be realized by device registration of the HEMS apparatus 101 with respect to the meter apparatus 102 according to the procedure of the ANSI C12.22 protocol or a device registration instruction message including the device identifier of the HEMS apparatus 101 may be separately defined.

If the HEMS apparatus 101 can directly connect to the AMI head end 301, further, it is determined whether an encryption key and certificate information used at the time of device registration of the apparatus are stored in the in-home meter apparatus 102. In addition to a method of using information of both the encryption key and the certificate, there is a possible method of using information of one of them.

If the in-home meter apparatus 102 stores the encryption key and the certificate information used for device registration of the HEMS apparatus 101, this shows that a secure communication route is established between the meter apparatus 102 and the AMI head end 301, and, on the route, the encryption key and the certificate information are transferred.

By contrast, if the in-home meter apparatus 102 does not store the encryption key and the certificate information, this shows that the meter apparatus 102 does not complete a device registration to the AMI head end 301 yet or a secure communication route is not established between these apparatuses.

If the HEMS apparatus 101 can directly connect to the AMI head end 301 and an encryption key and certificate information used by the own apparatus are stored in the meter apparatus 102, it is determined that the HEMS apparatus 101 implements a device registration. By contrast, if the encryption key and certificate information used by the own apparatus are not stored in the meter apparatus 102, it is determined that the in-home meter apparatus 102 implements a device registration.

That is, as described above, regarding the meter apparatus 102 according to the second embodiment, it is possible to set in advance an encryption key and certificate information shared between the AMI head end 301 and the meter apparatus 102 at the time of device installment by a provider that manages the AMI head end 301 such as an electrical power provider, but there is a characteristic that, since it is realized as an embedded device, it is not likely to have a high processing ability. On the other hand, it is assumed that the HEMS apparatus 101 is installed in a customer's home as a computing apparatus that can realize various kinds of processing and is initially registered by the user himself/herself. In this case, it is necessary to authenticate whether it is a normal apparatus that can get a supply-and-demand control service by the AMI head end 301. Also, although a method may be possible where different information between apparatuses is assigned to certificate information with respect to the HEMS apparatus 101 at the time of shipment and then the certificate information is distributed, there is a problem that it is not possible to dynamically associate information of the HEMS apparatus 101 and information of the above meter apparatus 102 on the AMI head end 301. Although a method is possible where all secure device registrations are implemented via the meter apparatus 102, there is a problem that a processing load increase of the meter apparatus 102 and a delay time increase due to transmission in a redundant communication route are caused. In view of the above problems, similar to the first embodiment, although the HEMS apparatus 101 needs to implement a device registration in many cases, in the second embodiment, in a case where the apparatus own encryption key and certificate information used for the device registration are not stored in the meter apparatus 102 yet, the meter apparatus 102 is instructed to perform a secure device registration instead.

Figure 30:
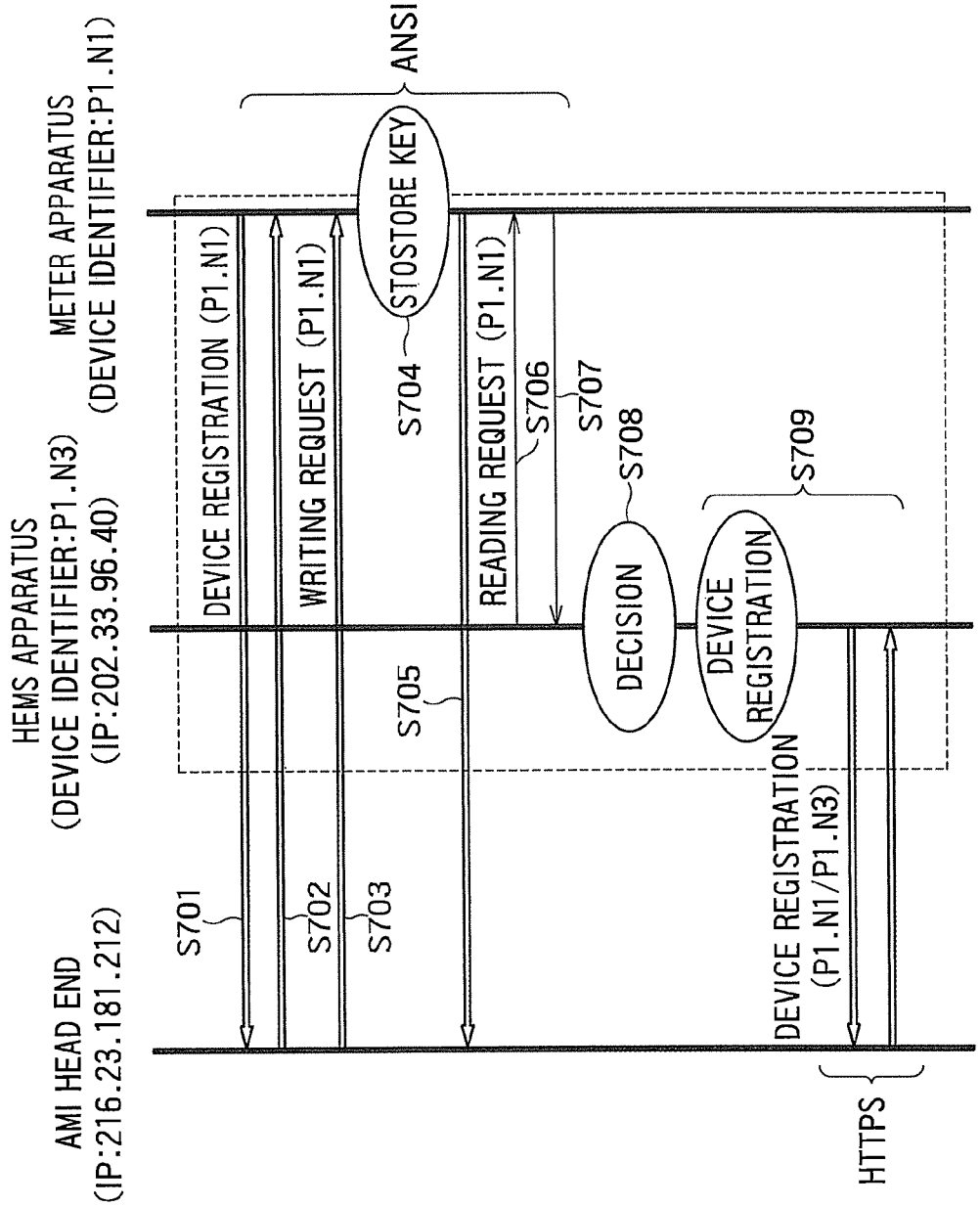
FIG. 30 illustrates a secure device registration sequence of the HEMS apparatus according to the second embodiment.

FIG. 30 illustrates a communication sequence in a case where the HEMS apparatus 101 determines that the own apparatus implements a device registration in the AMI head end 301.

After a device registration of the meter apparatus 102 is completed using a device registration message (S701 and S702), based on a writing request from the AMI head end 301 (S703) or a reading request to the AMI head end 301, an encryption key and certificate information used for device registration of the HEMS apparatus 101 are stored in the meter apparatus 102 (S704).

Configuration examples of a reading request message and a reading request response message according to the second embodiment are shown in FIG. 32 and FIG. 33. Also, configuration examples of a writing request message and a writing request response message are shown in FIG. 34 and FIG. 35. The destination identifier and the transmission source identifier in each message have the same role as the identifier of a device registration message processed by the meter apparatus 102 in the first embodiment. Although an explanation will be given with the consumption that each communication message in FIG. 32 to FIG. 35 is provided according to the procedure of the ANSI C12.22 protocol, it is needless to say that it can be equally realized using a communication protocol such as the HTTP protocol. The writing request message in FIG. 32 includes a destination identifier, a transmission source identifier, a reading type, a reading index and a reading byte count. The reading type denotes identification information designating whether to read all or part of data on a storage. In the case of partly reading it, for example, the table number on a data table defined by the ANSI C12.19 protocol and the element number in the table are designated. The reading byte count designates the size of data requested to be read, and is used in a case where a communication band is limited and where communication processing is implemented in several times. The reading request response message in FIG. 33 includes a destination identifier, a transmission source identifier, a reading result, a reading byte count and reading data. The reading result describes information which indicates success in a case where the reading of data on the storage is allowed and which indicates failure in a case where it is prohibited. The reading byte count denotes information indicating the byte count of the reading data. The reading data is provided subsequent to the byte sequence. It should be noted that, even regarding configuration information of the writing request message and the writing request response message in FIG. 34 and FIG. 35, although there is a difference in that the data writing on a storage of the destination apparatus is performed or the data reading from the storage is performed, they basically have the same roles as those of the reading request message and the reading request response message.

In the example of FIG. 30, after completing the device registration of the meter apparatus 102, the AMI head end 301 generates an encryption key and certificate information for other apparatuses installed in the same customer's home as that of the meter apparatus 102 and performs a writing request of the information (S703).

After storing the received encryption key and certificate information in the device information storage (S704), the meter apparatus 102 replies a writing request response message (S705).

The HEMS apparatus 101 transmits a reading request message to the in-home meter apparatus 102 before a start of device registration (S706) and checks whether an encryption key and certificate information that can be used by the own apparatus are stored. Since the meter apparatus 102 has these items of information, the HEMS apparatus 101 obtains the encryption key and the certificate information from the meter apparatus 102 (S707) and further obtains the device identifier of the meter apparatus, and determines that the own apparatus can perform a device registration (S708).

Based on the device identifiers of the own apparatus and the meter apparatus, the HEMS apparatus 101 implements a secure device registration in the AMI head end 301 according to the encryption key and the certificate information (S709). Although an example using HTTPS (Hyper Text Transfer Protocol over Secure Socket Layer) is shown in FIG. 30, as described above, the second embodiment does not depend on a specific communication protocol. Even regarding a communication protocol used for the HEMS apparatus 101 to obtain the encryption key and the certificate information stored in the meter apparatus 102, similarly, there is no problem even if it is realized using other communication protocols than the ANSI C12.22 protocol. In a case where the HEMS apparatus 101 performs a device registration, the AMI head end 301 replies encryption keys and certificate information for both the HEMS apparatus 101 and the meter apparatus 102, using a writing request response message or the like. The HEMS apparatus 101 obtains the encryption key and certificate information used by the own apparatus and the encryption key and certificate information used by the in-home meter apparatus 102. The HEMS apparatus 101 reports the encryption key and certificate information used by the meter apparatus 102 based on the writing request message, to the meter apparatus 102.

Figure 31:
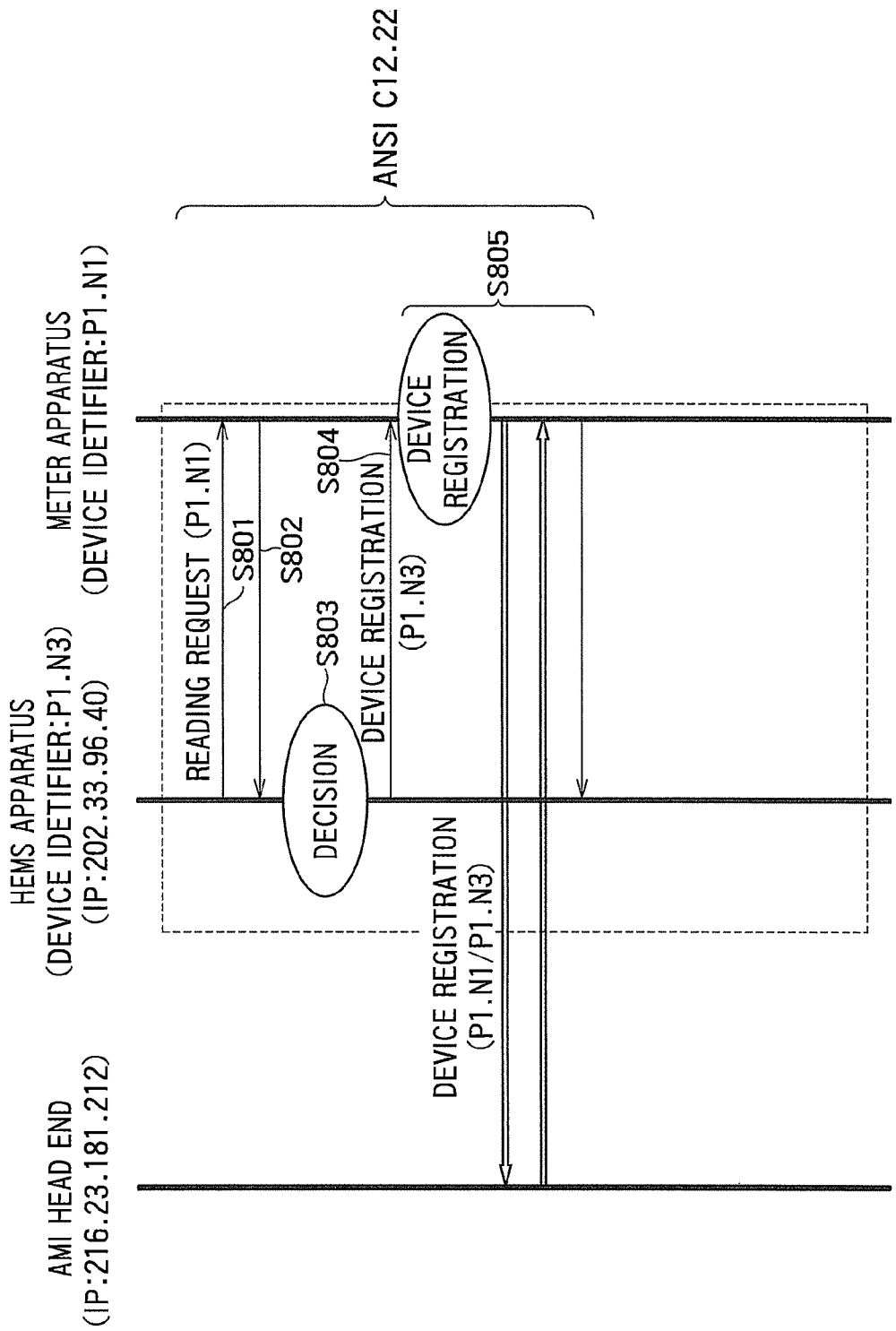
FIG. 31 illustrates a secure device registration sequence of the meter apparatus according to the second embodiment.

FIG. 31 illustrates a communication sequence in a case where a device registration in the AMI head end 301 is implemented by the meter apparatus 102 instead of the HEMS apparatus 101.

This shows that the meter apparatus 102 does not complete a device registration in the AMI head end 301 yet or a secure communication route is not established between these apparatuses.

The HEMS apparatus 101 transmits a reading request message for obtaining the encryption key and certificate information of the own apparatus, to the meter apparatus 102 (S801), and the meter apparatus 102 replies a result indicating that these items of information are not provided (S802). Therefore, the HEMS apparatus 101 determines that the meter apparatus performs a device registration in the AMI head end 301 instead (S803).

The HEMS apparatus 101 performs a device registration in the in-home meter apparatus 102 in the same way as in the first embodiment (S804) and forces the meter apparatus 102 to perform the device registration of the HEMS apparatus 101 in the AMI head end 301 instead (S805). In a case where the meter apparatus 102 performs the device registration, the AMI head end 301 relies the encryption keys and certificate information for both the HEMS apparatus 101 and the meter apparatus 102, using a writing request response message or the like. The meter apparatus 102 obtains the encryption key and certificate information used by the own apparatus and the encryption key and certificate information used by the HEMS apparatus 101. After giving a device registration instruction to the meter apparatus 102, the HEMS apparatus 101 obtains the encryption key and certificate information used by the own apparatus, based on the writing message transmitted together with a device registration response message. With respect to a device registration completion message from the meter apparatus according to the second embodiment, a communication message may be defined and adopted, which has a configuration combining content of communication messages for data table access shown in FIG. 33 and FIG. 34 with respect to the device registration response message in FIG. 18.

In the second embodiment, communication between the meter apparatus 102 and the AMI head end 301 is encrypted based on the definition of the ANSI C12.22 protocol. However, as described above, the second embodiment does not depend on a specific communication protocol, and therefore it is needless to say that the communication between the AMI head end 301, the meter apparatus 102 and the HEMS apparatus 101 can be equally realized using other communication protocols. Further, for the AMI head end 301, it may employ a configuration in which an authenticator for performing access control and an encryptor for ensuring the confidentiality of communication messages are separated.

Also, when the HEMS apparatus 101 and the meter apparatus 102 installed in the same customer's home perform transmission and reception of communication messages to each other, for example, it is preferable to apply device authentication or encryption processing based on the security system defined by standards such as ZigBee and ANSI C12.22. Especially, regarding authentication, it is preferable to implement it before the HEMS apparatus 101 makes a query about information to the meter apparatus 102 in FIG. 30 and FIG. 31.

Figure 36:
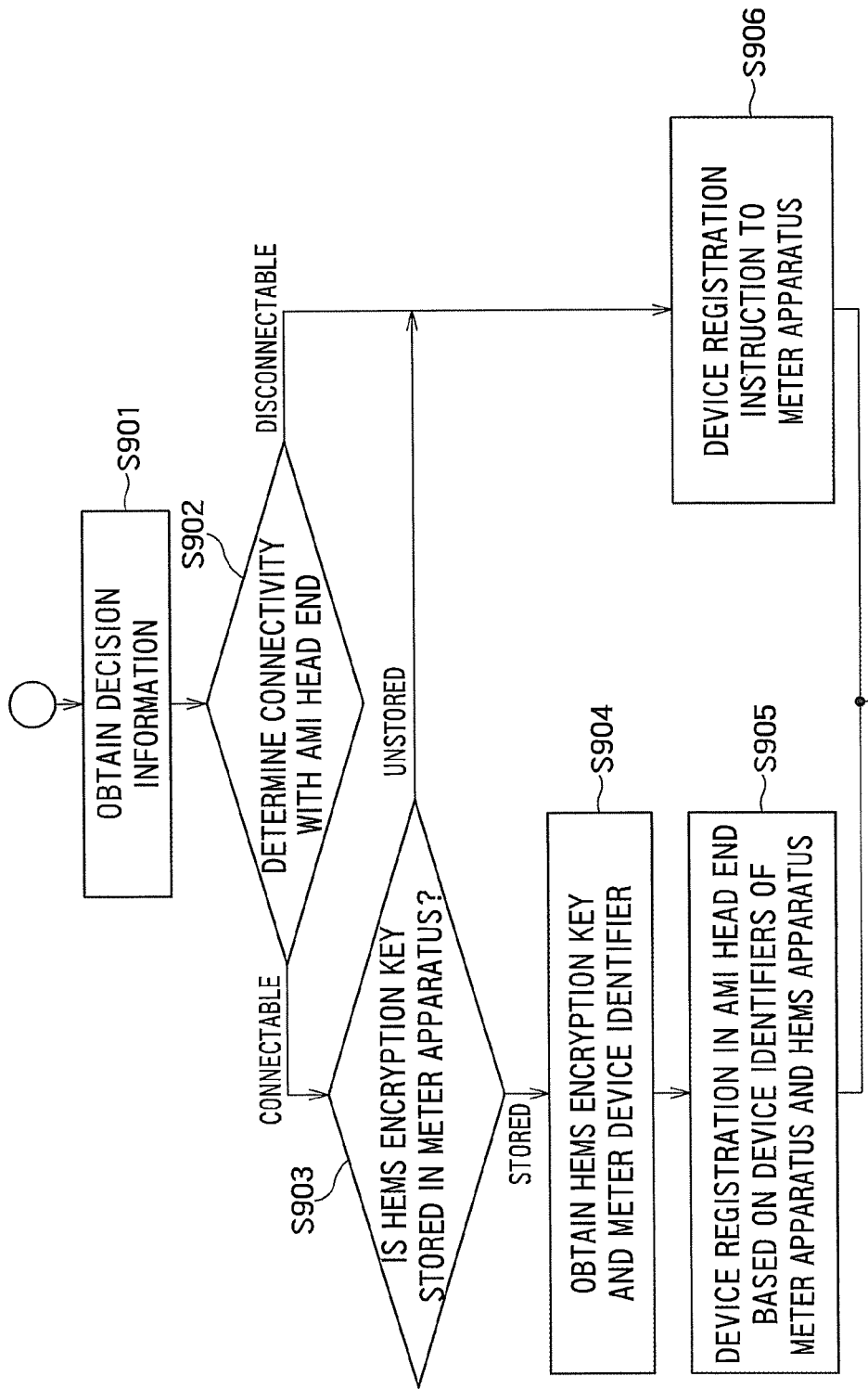
FIG. 36 illustrates an operation flowchart of the HEMS apparatus according to the second embodiment.

FIG. 36 illustrates a flowchart of operation processing of the HEMs apparatus 101 according to the second embodiment.

Similar to the first embodiment, the HEMS apparatus 101 determines whether direct connection with the AMI head end 301 on the Internet is possible (S901 and S902), and, if the connection is possible, the own apparatus determines whether an encryption key and certificate information used upon performing a device registration are stored in the in-home meter apparatus 102 (S903). If the information is stored, the encryption key and the certificate information are obtained from the meter apparatus 102 and the device identifier of the meter apparatus is obtained (S904), and, based on the device identifiers of the own apparatus and the meter apparatus, a secure device registration in the AMI head end 301 is implemented (S905). By contrast, if the information is not stored or the direct connection with the AMI head end 301 is not possible, a device registration instruction is given to the meter apparatus (S906).

Thus, according to an energy management apparatus of the second embodiment (i.e. HEMS apparatus 101), by determining a subject apparatus required to perform a device registration according to whether an encryption key and certificate information used for the own apparatus to perform a device registration in the AMI head end 301 are stored in the in-home meter apparatus 102, it is possible to provide an advantage of ensuring the security such as the confidentiality, the completeness and the availability while encrypting and authenticating a communication message related to device registration to be transmitted/received to/from the AMI head end 301 on the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A computer-implemented energy management apparatus comprising:
a communicator capable of communicating with at least a meter apparatus among the meter apparatus and a server apparatus, the meter apparatus measuring a used energy amount of a device and the server apparatus collecting measurement information from the meter apparatus;
a device registration processor configured to determine whether direct communication with the server apparatus is possible for the communicator; if direct communication with the server apparatus is possible, transmit to the server apparatus a device registration message that requests to register a device identifier of the meter apparatus and a device identifier of the energy management apparatus to be associated with each other in the server apparatus; and, if direct communication with the server apparatus is not possible, transmit a registration instruction to the meter apparatus that instructs a transmission of the device registration message to the server apparatus;
a communication processor configured to obtain energy control information of the device via a network from the server apparatus; and
a control executor configured to control the used energy amount of the device based on the energy control information,
wherein at least one of the communicator, the device registration processor, the communication processor and the control executor is implemented in hardware.

2. The apparatus according to claim 1, wherein, when it is determined that direct communication with the server apparatus is possible, the device registration processor receives the device identifier of the meter apparatus from the meter apparatus, generates the device registration message, and transmits the device registration message to the server apparatus, the device registration message including the device identifier of the meter apparatus and the device identifier of the energy management apparatus.

3. The apparatus according to claim 2, wherein, when it is determined that direct communication with the server apparatus is not possible, the device registration processor transmits, to the meter apparatus, a registration instruction message that instructs a transmission of the device registration message, the registration instruction message including the device identifier of the energy management apparatus.

4. The apparatus according to claim 3, wherein:
the device identifier of the energy management apparatus is an application identifier defined by a communication protocol used on the communicator; and
the device identifier of the meter apparatus is an application identifier defined by a communication protocol used on the meter apparatus.

5. The apparatus according to claim 4, wherein:
the device identifier of the energy management apparatus includes identification information of a communication medium used by the communicator and an individual identifier of the communication medium; and
the device identifier of the meter apparatus includes identification information of a communication medium used by the meter apparatus and an individual identifier of the communication medium.

6. A system comprising a computer-implemented energy management apparatus according to claim 1, a meter apparatus that measures a used energy amount of the device and a server apparatus that collects measurement information from the meter apparatus, wherein the meter apparatus comprises:
a communicator configured to communicate with the server apparatus and the energy management apparatus;
a storage configured to store a first encryption key;
a measurer configured to measure the used energy amount of the device to obtain the measurement information;
a measurement information communication processor configured to transmit a report message to the server apparatus via the communicator, the report message being created based on the measurement information;
a device registration processor configured to generate the device registration message including a device identifier of the energy management apparatus and a device identifier of the meter apparatus when receiving a transmission instruction of the device registration message from the energy management apparatus; and
an encryption processor configured to encrypt the device registration message with the first encryption key in the storage and transmit an encrypted message to the server apparatus via the communicator.

7. The system according to claim 6, wherein:
the measurement information communication processor receives a second encryption key from the server; and
the storage stores the second encryption key,
the communicator receives from the energy management apparatus a query as to whether the second encryption key exists; if the second encryption key exists in the storage, transmits the second encryption key to the energy management apparatus via the communicator; and, if no second encryption key exists in the storage, reports information showing that no second encryption key exists to the energy management apparatus.

8. The system according to claim 7, wherein:
the device registration processor of the energy management apparatus queries the meter apparatus whether the second encryption key exists in the meter apparatus in a case where it is determined that direct communication by the communicator with the server apparatus is possible, obtains the second encryption key from the meter apparatus if the second encryption key exists, and instructs the meter apparatus to transmit the device registration message if no second encryption key exists; and
the encryption processor encrypts the device registration message with the second encryption key and transmits the encrypted message to the server apparatus.

9. The system according to claim 8, wherein:
the device registration processor queries the meter apparatus whether the second encryption key exists in the meter apparatus in a case where it is determined that direct communication by the communicator with the server apparatus is possible, obtains the second encryption key from the meter apparatus if the second encryption key exists, and instructs the meter apparatus to encrypt the device registration message with the first encryption key and transmit the encrypted device registration message to the server apparatus if no second encryption key exists; and
the encryption processor encrypts the device registration message with the encryption key and transmits the encrypted message to the server apparatus.

* * * * *